(12) United States Patent
Kitamori et al.

(10) Patent No.: US 8,705,373 B2
(45) Date of Patent: Apr. 22, 2014

(54) APPARATUS AND METHOD FOR PACKET FORWARDING

(75) Inventors: Katsuya Kitamori, Kawasaki (JP); Eiji Sugawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 220 days.

(21) Appl. No.: 13/315,690

(22) Filed: Dec. 9, 2011

(65) Prior Publication Data

US 2012/0147742 A1   Jun. 14, 2012

(30) Foreign Application Priority Data

Dec. 14, 2010   (JP) ................................. 2010-278390

(51) Int. Cl.
*H04L 12/26* (2006.01)

(52) U.S. Cl.
CPC .................................. *H04L 43/0805* (2013.01)
USPC ........................................................ 370/241

(58) Field of Classification Search
CPC .................................................. H04L 43/0805
USPC ......... 370/241, 242, 244, 245, 248, 351, 389; 709/223, 224, 238–244
See application file for complete search history.

(56) References Cited

U.S. PATENT DOCUMENTS

| | | | | |
|---|---|---|---|---|
| 5,544,154 | A * | 8/1996 | Glitho ........................... | 370/248 |
| 6,813,242 | B1 * | 11/2004 | Haskin et al. ................. | 370/229 |
| 6,915,436 | B1 * | 7/2005 | Booth et al. ..................... | 726/3 |
| 7,286,467 | B1 * | 10/2007 | Sylvain ......................... | 370/216 |
| 7,418,203 | B2 | 8/2008 | Shioda et al. | |
| 7,619,982 | B2 * | 11/2009 | Blair et al. .................... | 370/248 |
| 7,756,019 | B2 * | 7/2010 | Zhai ............................. | 370/228 |
| 7,801,049 | B2 * | 9/2010 | He .............................. | 370/241.1 |
| 7,961,599 | B2 * | 6/2011 | Proulx .......................... | 370/218 |
| 8,116,213 | B2 * | 2/2012 | Krygowski .................... | 370/248 |
| 8,134,917 | B2 * | 3/2012 | Fredette et al. ................ | 370/218 |
| 8,149,719 | B2 * | 4/2012 | Bugenhagen ................. | 370/241 |
| 2005/0169187 | A1 * | 8/2005 | Taylor et al. .................. | 370/248 |
| 2012/0275781 | A1 * | 11/2012 | McDonald et al. ............. | 398/25 |

FOREIGN PATENT DOCUMENTS

JP   2005-217904 A   8/2005

* cited by examiner

*Primary Examiner* — Dmitry H Levitan
(74) *Attorney, Agent, or Firm* — Fujitsu Patent Center

(57) ABSTRACT

A method for packet forwarding, including receiving packets; extracting a test packet containing information indicating a path to be verified from the received packets; and forwarding the test packet to the path to be verified, rather than to a first path to which the received packets are forwarded, based on the information indicating the path to be verified contained in the test packet.

8 Claims, 31 Drawing Sheets

FIG. 6

| WORKING PATH | BACKUP PATH | |
|---|---|---|
| (#x    )→(#1-W1) |  | ~12a |
| (#3-W1)→(#2-W2) | (#2-P1)→(#1-P2) | ~22a |
| (#1-W2)→(#2-W3) | (#2-P6)→(#1-P1) | ~32a |
| (#1-W3)→(#2-W4) | (#2-P5)→(#1-P6) | ~42a |
| (#1-W4)→(#3-W5) | (#2-P4)→(#1-P5) | ~52a |
| (#1-W5)→(#y    ) |  | ~62a |
|  | (#2-P2)→(#1-P3) | ~72a |
|  | (#2-P3)→(#1-P4) | ~82a |

FIG. 7

| PORT #1<br>FAULT BYPASS PATH INFORMATION | PORT #2<br>FAULT BYPASS PATH INFORMATION | |
|---|---|---|
| | | ~14a |
| | (#3-W1)→(#1-P2) | ~24a |
| (#2-P6)→(#2-W3) | (#1-W2)→(#1-P1) | ~34a |
| (#2-P5)→(#2-W4) | (#1-W3)→(#1-P6) | ~44a |
| (#2-P4)→(#3-W5) | | ~54a |
| | | ~64a |
| | | ~74a |
| | | ~84a |

FIG. 26

| TRANSIT NODE | BRANCH NODE | MERGE NODE | NUMBER OF TRANSIT NODES |
|---|---|---|---|
| NODE1 | – | – | 0 |
| NODE2 | – | – | 1 |
| NODE3 | – | – | 2 |
| NODE4 | – | – | 3 |
| NODE5 | – | – | 4 |
| NODE6 | – | – | 5 |

| TRANSIT NODE | BRANCH NODE | MERGE NODE | NUMBER OF TRANSIT NODES |
|---|---|---|---|
| NODE1 | - | - | 0 |
| NODE2 | - | - | 1 |
| NODE3 | NODE3 | - | 2 |
| NODE2 | NODE3 | - | 3 |
| NODE7 | NODE3 | - | 4 |
| NODE8 | NODE3 | - | 5 |
| NODE5 | NODE3 | - | 6 |
| NODE4 | NODE3 | NODE4 | 7 |
| NODE5 | NODE3 | NODE4 | 8 |
| NODE6 | NODE3 | NODE4 | 9 |

| | WORKING PATH | BACKUP PATH | BACKUP PATH |
|---|---|---|---|
| 12b | (#x  )→(#1-W1) | | |
| 22b | (#2-W1)→(#1-W2) | | (#2-W1)→(#3-P1) |
| 32b | (#2-W2)→(#1-W3) | | |
| 42b | (#2-W3)→(#y  ) | (#1-P3)→(#y  ) | |
| 52b | | (#3-P1)→(#2-P2) | |
| 62b | | (#1-P2)→(#2-P3) | |

(columns: 14b, 24b, 34b, 44b, 54b, 64b)

APPARATUS AND METHOD FOR PACKET FORWARDING

CROSS-REFERENCE TO RELATED APPLICATION(S)

This application is based upon and claims the benefit of priority of the prior Japanese Patent Application No. 2010-278390, filed on Dec. 14, 2010, the entire contents of which are incorporated herein by reference.

FIELD

The embodiments discussed herein are related to apparatuses and methods for packet forwarding.

BACKGROUND

Recently, packet forwarding has increasingly been applied to the field of telecommunications carriers with advances in packet technology. The predominant network configuration is a ring network, which is advantageous in terms of wiring efficiency and fault bypass. In particular, ring networks based on label switching such as multiprotocol label switching (MPLS) have been widely applied.

The application of packet forwarding to the field of telecommunications carriers requires high reliability. As means for bypassing a fault, fault bypass techniques similar to unidirectional path-switched ring (UPSR) and bidirectional line-switched ring (BLSR), which are standard for synchronous digital hierarchy (SDH) and synchronous optical network (SONET), have also been proposed for MPLS networks.

For BLSR, when a fault occurs in a working path, traffic (packets) is rerouted to a backup path set to be opposite in direction to the working path in a bidirectional ring. Therefore, no traffic (packets) flows through the backup path before a fault occurs.

A related technique is disclosed in Japanese Laid-Open Patent Publication No. 2005-217904.

SUMMARY

According to an aspect of the invention, a method for packet forwarding, includes receiving packets; extracting a test packet containing information indicating a path to be verified from the received packets; and forwarding the test packet to the path to be verified, rather than to a first path to which the received packets are forwarded, based on the information indicating the path to be verified contained in the test packet.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram showing label tables used in the second embodiment;

FIG. 7 is a diagram showing bypass path information stored in fault bypass control sections;

FIG. 26 is a table illustrating transition of data stored in a backup path test packet that passes only through the working path in an example of the fifth embodiment;

FIG. 27 is a table illustrating transition of data stored in a backup path test packet that passes through both the working path and the backup path in the example of the fifth embodiment;

FIG. 29 is a diagram showing label tables and fault bypass path management tables used in the sixth embodiment;

DESCRIPTION OF EMBODIMENT(S)

For BLSR, the availability or normality of a backup path cannot be checked in advance because traffic (packets) does not flow through the backup path until a fault occurs.

Whereas ring networks based on label switching have been mentioned, other networks for forwarding packet traffic share the same problem.

Embodiments will now be described in detail with reference to the drawings.

Packet-forwarding apparatuses according to the embodiments will be generally described first, and then the embodiments will be specifically described.

First Embodiment

Figure 1:
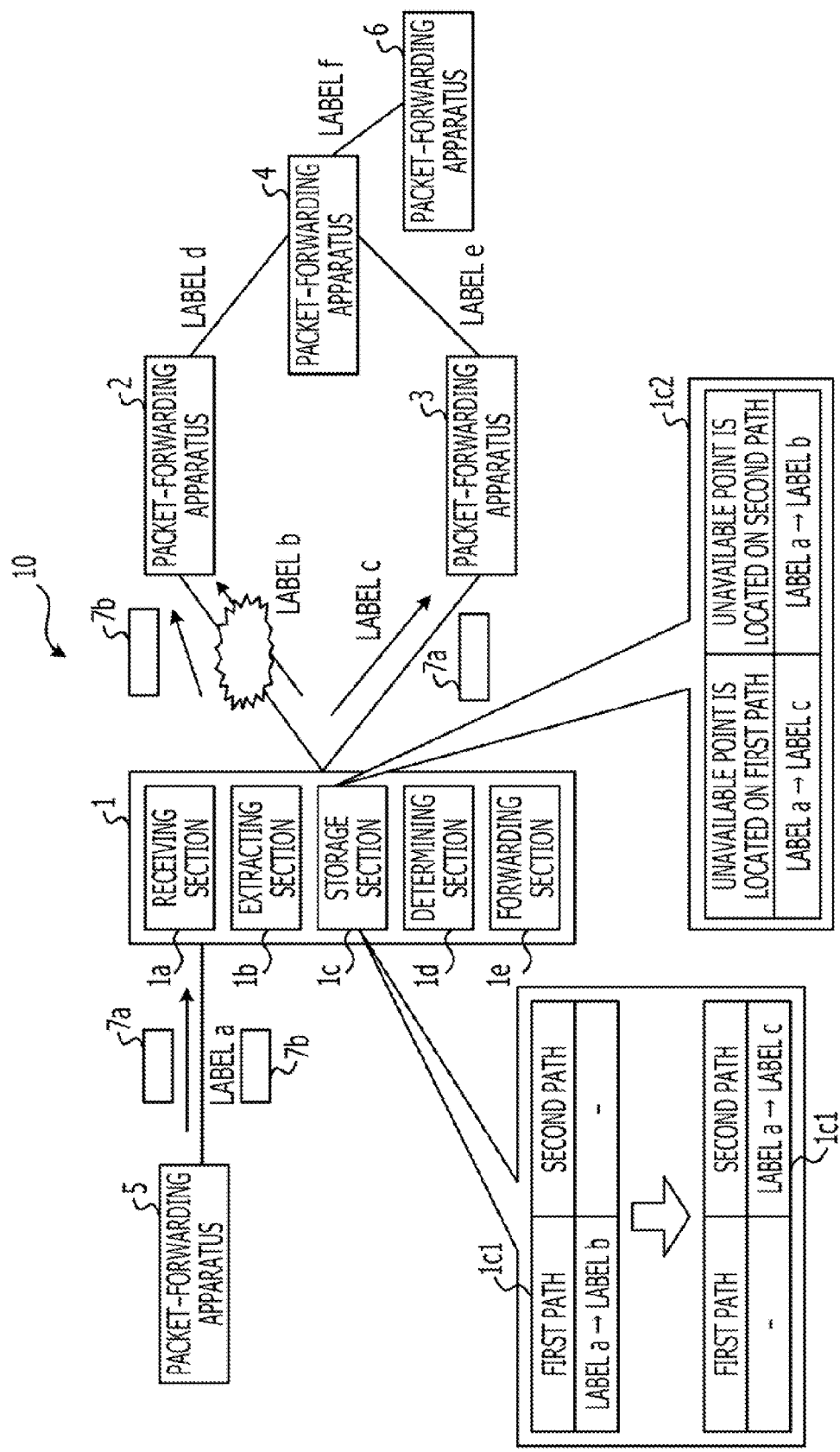
FIG. 1 is a diagram generally showing packet-forwarding apparatuses according to a first embodiment.

FIG. 1 is a diagram generally showing packet-forwarding apparatuses according to a first embodiment.

A network system 10 shown in FIG. 1 includes a plurality of packet-forwarding apparatuses (computers) 1, 2, 3, and 4 that form a loop network, a packet-forwarding apparatus 5 connected to the packet-forwarding apparatus 1, and a packet-forwarding apparatus 6 connected to the packet-forwarding apparatus 4.

The network system 10 operates as a packet relay system. Specifically, a packet transmitted by an apparatus (not shown) is received by some packet-forwarding apparatus. The packet-forwarding apparatus in turn forwards the received packet to another packet-forwarding apparatus. Finally, the packet is forwarded from that packet-forwarding apparatus to a destination apparatus (not shown).

The operation of the network system 10 will now be described, taking as an example packet forwarding from the packet-forwarding apparatus 5 to the packet-forwarding apparatus 6.

First and second paths for transmitting packets are set up between the packet-forwarding apparatuses 5 and 6.

The first path is a path through which packets pass from the packet-forwarding apparatus 1 through the packet-forwarding apparatuses 2 and 4 to reach the packet-forwarding apparatus 6. The second path is a path through which packets pass from the packet-forwarding apparatus 1 through the packet-forwarding apparatuses 3 and 4 to reach the packet-forwarding apparatus 6. In the description below, the first path is assumed as the main path, and the second path is assumed as an alternative path (auxiliary or backup path) used when some malfunction occurs in the main path.

Types of packets transmitted by the packet-forwarding apparatus 5 include a test packet 7a for verifying the path to be verified and a packet 7b other than the test packet 7a. In this embodiment, the second path is the path to be verified. To verify the second path, the packet-forwarding apparatus 5 generates a test packet 7a containing pseudo information indicating that the link between the packet-forwarding apparatuses 1 and 2 is unavailable (unavailability information). The packet-forwarding apparatus 5 transmits the generated test packet 7a to the packet-forwarding apparatus 1.

The packet-forwarding apparatus 1 includes a receiving section 1a, an extracting section 1b, a storage section 1c, a determining section 1d, and a forwarding section 1e.

The receiving section 1a receives packets from the packet-forwarding apparatus 5.

The test packet 7a and the packet 7b both contain a label "a".

The label "a" serves as routing information that the packet-forwarding apparatus 1 uses to forward a packet received from the packet-forwarding apparatus 5 to another packet-forwarding apparatus. When some packet-forwarding apparatus receives a packet from an apparatus (not shown) other than the network system 10, the packet-forwarding apparatus adds a label based on destination information contained in the packet and forwards it to the next packet-forwarding apparatus. The next packet-forwarding apparatus refers to the label added to the packet, determines to which packet-forwarding apparatus to forward the packet, and forwards the packet to that packet-forwarding apparatus.

The determination uses, for example, a table that associates the label added to the received packet with where to forward a packet having that label (for example, a port of the packet-forwarding apparatus).

The packet-forwarding apparatus 1 has the function of rewriting the labels contained in the test packet 7a and the packet 7b to labels stored in the storage section 1c. In label-switched networks, generally, a label added to a packet is rewritten each time the packet passes through a packet-forwarding apparatus.

The extracting section 1b extracts the test packet 7a from the received packets.

The storage section 1c stores a table 1c1 containing first path information indicating to which path to forward the test packet 7a and the packet 7b received by the receiving section 1a. In FIG. 1, the first path information includes information indicating that the label "a" is switched to a label "b" if the packet 7b is to be forwarded to the first path.

In addition, the storage section 1c stores a table 1c2 containing second path information for switching the path through which the test packet 7a passes to the path to be verified depending on the unavailability information contained in the test packet 7a. In FIG. 1, the second path information includes information indicating that the label "a" is rewritten to a label "c" if the unavailable point is located on the first path and that the label "a" is rewritten to the label "b" if the unavailable point is located on the second path.

The table 1c2 is used to change where to forward the test packet 7a at the packet-forwarding apparatus 1, which is a branch point where the packet-forwarding apparatus to which the test packet 7a is to be forwarded differs between the first path and the second path.

After the extracting section 1b extracts the test packet 7a, the determining section 1d determines to which path to forward the test packet 7a based on the second path information stored in the storage section 1c.

In this embodiment, the test packet 7a contains unavailability information indicating that the link between the packet-forwarding apparatuses 1 and 2 is unavailable, which indicates that the unavailable point is located on the first path. Accordingly, the determining section 1d determines to forward the test packet 7a to the packet-forwarding apparatus 3 on the second path. The determining section 1d then refers to the table 1c2 in the storage section 1c and determines to rewrite the label "a" contained in the test packet 7a to the label "c".

The forwarding section 1e forwards the test packet 7a according to the path determined by the determining section 1d. Specifically, the forwarding section 1e switches the label "a" contained in the test packet 7a to the label "c" and forwards the label-switched test packet 7a to the packet-forwarding apparatus 3, which corresponds to the second path.

In addition, the determining section 1d can determine to which path to forward the packet 7b based on the first path information contained in the table 1c1. In this embodiment, the determining section 1d determines to switch the label "a" to label "b" because the main path is the first path.

The forwarding section 1e forwards the packet 7b according to the path determined by the determining section 1d. Specifically, the forwarding section 1e switches the label "a"

contained in the packet 7b to the label "b" and forwards the label-switched packet 7b to the packet-forwarding apparatus 2, which corresponds to the first path.

Next, the operation of the packet-forwarding apparatus 1 will be described with reference to FIG. 1. After the extracting section 1b extracts the test packet 7a, which contains unavailability information, from the packets received by the receiving section 1a, the determining section 1d refers to the table 1c2 and determines to switch the label "a" contained in the test packet 7a to the label "c". The forwarding section 1e switches the label "a" contained in the test packet 7a to the label "c" and forwards the label-switched test packet 7a to the packet-forwarding apparatus 3, which corresponds to the second path. As a result, the test packet 7a is forwarded to the packet-forwarding apparatus 3.

The packet-forwarding apparatus 3 that has received the test packet 7a switches the label "c" contained in the test packet 7a to a label "e" and forwards the label-switched test packet 7a. As a result, the test packet 7a is forwarded to the packet-forwarding apparatus 4. The packet-forwarding apparatus 4 that has received the test packet 7a switches the label "e" contained in the test packet 7a to a label "f" and forwards the label-switched test packet 7a. As a result, the test packet 7a is forwarded to the packet-forwarding apparatus 6.

On the other hand, the packet-forwarding apparatus 1 forwards the packet 7b based on the information contained in the table 1c1 about where to forward the packet 7b. Because the packet 7b contains no unavailability information, the packet-forwarding apparatus 1 switches the label "a" to the label "b" based on the information contained in the first path column of the table 1c1 about where to forward the packet 7b and forwards the label-switched packet 7b to the packet-forwarding apparatus 2, which corresponds to the first path. As a result, the packet 7b is forwarded to the packet-forwarding apparatus 2.

The packet-forwarding apparatus 2 that has received the packet 7b switches the label "b" contained in the packet 7b to a label "d" and forwards the label-switched packet 7b. As a result, the packet 7b is forwarded to the packet-forwarding apparatus 4.

The packet-forwarding apparatus 4 that has received the packet 7b switches the label "d" contained in the packet 7b to the label "f" and forwards the label-switched packet 7b. As a result, the packet 7b is forwarded to the packet-forwarding apparatus 6.

In this way, the packet-forwarding apparatus 1 can forward the test packet 7a to the second path, which is a backup path, without affecting the packet 7b flowing through the first path. This allows verification of the availability of the backup path during operation of the network system 10, thus improving the reliability of the network system 10.

The functions of the receiving section 1a, the extracting section 1b, the determining section 1d, and the forwarding section 1e can be implemented by a processor (central processing unit (CPU)) in the packet-forwarding apparatus 1. The function of the storage section 1c, on the other hand, can be implemented by a data storage, such as a random-access memory (RAM) or read-only memory (ROM), in the packet-forwarding apparatus 1.

Embodiments will now be more specifically described.

Second Embodiment

Figure 2:
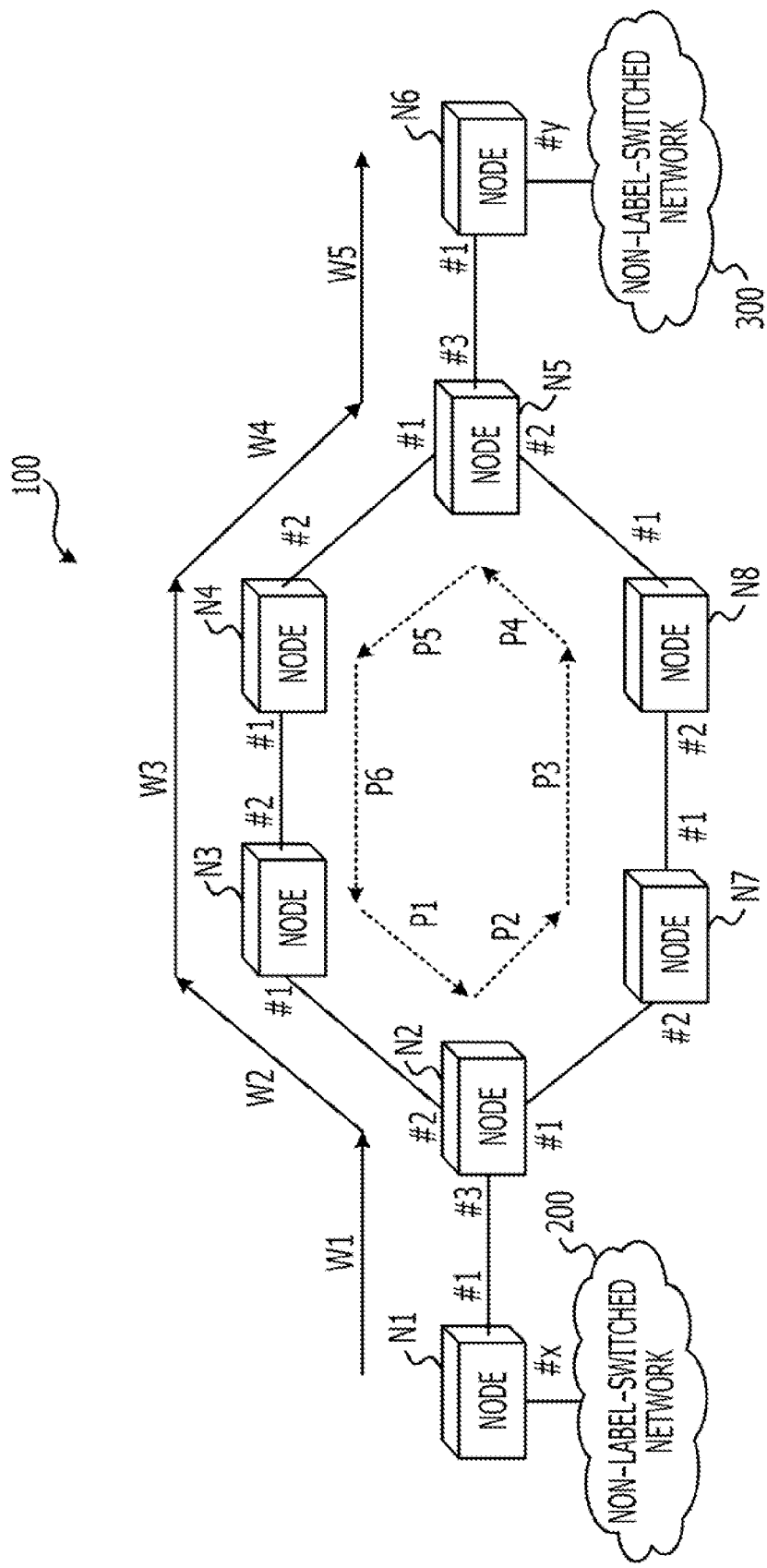
FIG. 2 is a diagram showing a network system according to a second embodiment.

FIG. 2 is a diagram showing a network system according to the second embodiment.

A network system 100 according to this embodiment is an MPLS transport profile (MPLS-TP) network.

In FIG. 2, nodes N1 to N8 are nodes included in the network system 100, and the lines linking the nodes are physical lines for packets to flow through.

The node N1 is a start or end node in the network system 100 from or to which packets are forwarded over a label switching path (LSP). The node N1 is linked to a non-label-switched network 200 that does not use label switching for packet forwarding (that does not belong to the network system 100).

The node N6 is a start or end node in the network system 100 from or to which packets are forwarded over an LSP. The node N6 is linked to a non-label-switched network 300 that does not use label switching (that does not belong to the network system 100).

The nodes N2, N3, N4, N5, N7, and N8 form a loop network (ring network).

The numerals shown around the nodes, namely, #1, #2, and #3, indicate port numbers of the nodes to which physical lines are connected.

In the network system 100, two paths, namely, working and backup paths, are set up as packet forwarding paths.

The working path is a path used to forward packets from the node N1 to the node N6. The working path is a packet forwarding path used when there is no fault in any of the links between the nodes N2 and N3, between the nodes N3 and N4, and between the nodes N4 and N5.

In FIG. 2, the node N1 is the start node of the working path, from which packets pass through the nodes N2, N3, N4, and N5 to reach the node N6, which is the end node.

The backup path, on the other hand, is a path used to forward packets from the node N1 to the node N6. The backup path is a packet forwarding path used when a fault occurs in one or more of the links between the nodes N2 and N3, between the nodes N3 and N4, and between the nodes N4 and N5.

Thus, the network system 100 has a fault bypass path defined in advance. Each node has paths to which packets are to be forwarded, including the backup path, set up in advance. This allows the use of the bypass path, that is, the backup path, immediately after a fault occurs. As used herein, the term "fault" includes a disconnection in a physical line between nodes and a failure in a node itself.

In FIG. 2, labels W1 to W5 are added to the packets forwarded between the nodes on the working path, where the thick solid-line arrows indicate the direction of the working path.

Labels P1 to P6 are added to the packets forwarded between the nodes on the backup path, where the dotted-line arrows indicate the direction of the backup path.

The backup path is set up as a loop passing through the nodes in the direction opposite to that of the working path. In a normal (non-faulty) condition, no packets flow through the backup path. The backup path is registered in the nodes in advance.

If a fault occurs between any nodes forming the loop of the working path, namely, between the nodes N2 and N3, between the nodes N3 and N4, or between the nodes N4 and N5, the following operation is started.

Specifically, the node on one side of the point where the fault has occurred (hereinafter referred to as "point of fault") forwards packets coming from the working path to the backup path. This allows the packets to bypass the point of fault.

The point of fault can also be called a segment where a fault has occurred.

In addition, the network system 100 has the function of executing a test for checking whether or not the backup path functions normally.

To test the backup path, the node N1 generates a packet for testing the backup path (hereinafter referred to as "backup path test packet") and transmits it to the node N2. If the backup path functions normally, the backup path test packet passes through the backup path described above to reach the node N6. If there is any malfunction in the backup path, on the other hand, the backup path test packet fails to reach the node N6.

Figure 3:
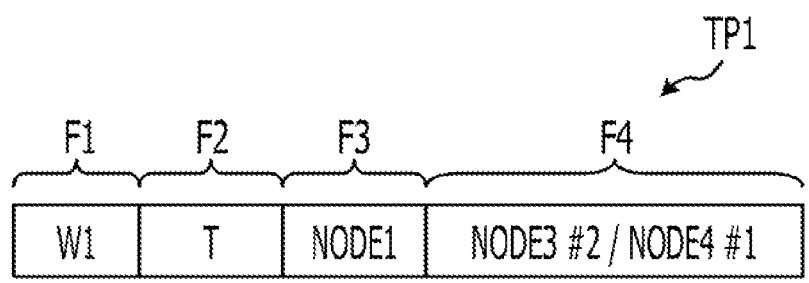
FIG. 3 is a diagram showing a format for a backup path test packet used in the second embodiment.

FIG. 3 is a diagram showing a format for a backup path test packet used in the second embodiment.

A backup path test packet TP1 has fields F1 to F4 for storing information indicating the label, the type, the start node, and the pseudo point of fault, respectively.

The field F1 contains information identifying the label, that is, a label identifier. In FIG. 3, the field F1 is set to "W1."

The field F2 contains information used by the nodes N2 to N8 to identify the packet as a backup path test packet 7a, that is, a test packet identifier. In this embodiment, the field F2 is set to "T."

The field F3 contains information identifying the node that has transmitted the packet, that is, a source node identifier. In FIG. 3, the field F3 is set to "Node 1," which indicates the node N1.

The field F4 contains information indicating where a pseudo fault occurs, which is specified by an apparatus-managing section 11, described later. In FIG. 3, the field F4 is set to "Node 3 #2/Node 4 #1," which indicates that a pseudo fault has occurred between the port #2 of the node N3 and the port #1 of the node N4.

Other examples of information, stored in the field F4, that indicates where a pseudo fault occurs include information indicating where a pseudo fault occurs in a network or a management path segment, such as labels uniquely assigned to the links between the nodes and maintenance intermediate point (MIP) IDs.

Next, the hardware configuration of the nodes will be described.

Figure 4:
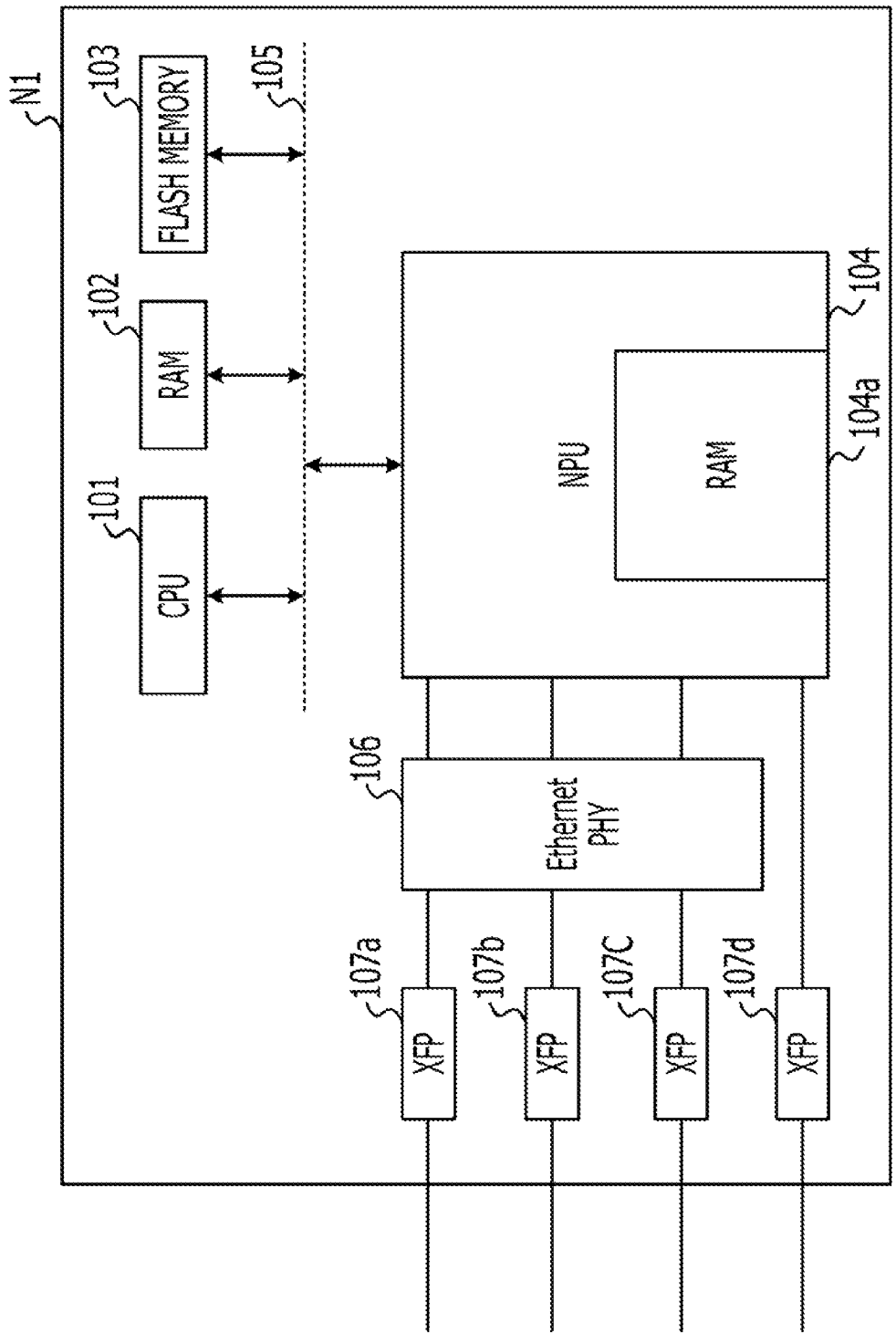
FIG. 4 is a diagram showing an example of the hardware configuration of a node according to the second embodiment.

FIG. 4 is a diagram showing an example of the hardware configuration of the node 1 according to the second embodiment. The entire node N1 is controlled by a CPU 101. The CPU 101 is connected to a RAM 102 and a plurality of peripheral devices via a bus 105.

This hardware configuration can also be applied to nodes of other embodiments.

The RAM 102 is used as a main storage of the node N1. The RAM 102 temporarily stores at least part of an operating system (OS) program executed by the CPU 101 and application programs that implement various functions described in the embodiments. The RAM 102 also stores various types of data required for processing by the CPU 101.

The peripheral devices connected to the bus 105 include a flash memory 103 and a network processing unit (NPU) 104.

The flash memory 103 is used as a secondary storage of the node N1. The flash memory 103 stores an OS program, application programs, and various types of data.

The NPU 104 is a dedicated processor that executes network-related processing. The NPU 104 includes a RAM 104a that stores a label table, described later. The NPU 104 is connected to an Ethernet® physical layer (PHY) chip 106.

The Ethernet® PHY chip 106 is an electronic circuit that supports the physical layer, having collision detection, jabber protection, code conversion, and serial-parallel conversion functions.

The collision detection function is the function of notifying a source terminal that a packet transmitted by the PHY chip has caused collision.

The jabber protection function is the function of forcedly interrupting an extraordinarily long signal (for example, 20 ms or more) transmitted by the node connected to the PHY chip as a result of some fault.

The code conversion function is the function of converting a code to be transmitted by the node and a code on a cable.

The serial-parallel conversion function is the function of converting a parallel signal to be transmitted by the node and a serial signal on a cable.

The Ethernet® PHY chip 106 has XFPs (10(X) gigabit small form factor pluggable) 107a, 107b, 107c, and 107d connected thereto.

The XFPs 107a, 107b, 107c, and 107d are photoelectric conversion modules and are responsible for fault detection function at the optical level.

The XFPs 107a, 107b, 107c, and 107d can also be called "receiving circuits" or "input ports" for packets forwarded from the network to the node N1. The XFPs 107a, 107b, 107c, and 107d can also be called "transmitting circuits" or "output ports" for packets forwarded from the node N1 to the network. The XFPs 107a, 107b, 107c, and 107d can also be called "transmitting/receiving circuits" or "ports" for packets.

The processing functions of this embodiment can be implemented by the above hardware configuration. Whereas the hardware configuration of the node N1 is shown in FIG. 3, the nodes N2 to N8 have similar hardware configurations.

Some or all of the processes executed by the CPU 101 and the RAM 102 may be executed by the NPU 104 and the RAM 104a. Conversely, some or all of the processes executed by the NPU 104 and the RAM 104a may be executed by the CPU 101 and the RAM 102.

With the above hardware configuration, the node N1 has the following functions.

Figure 5:
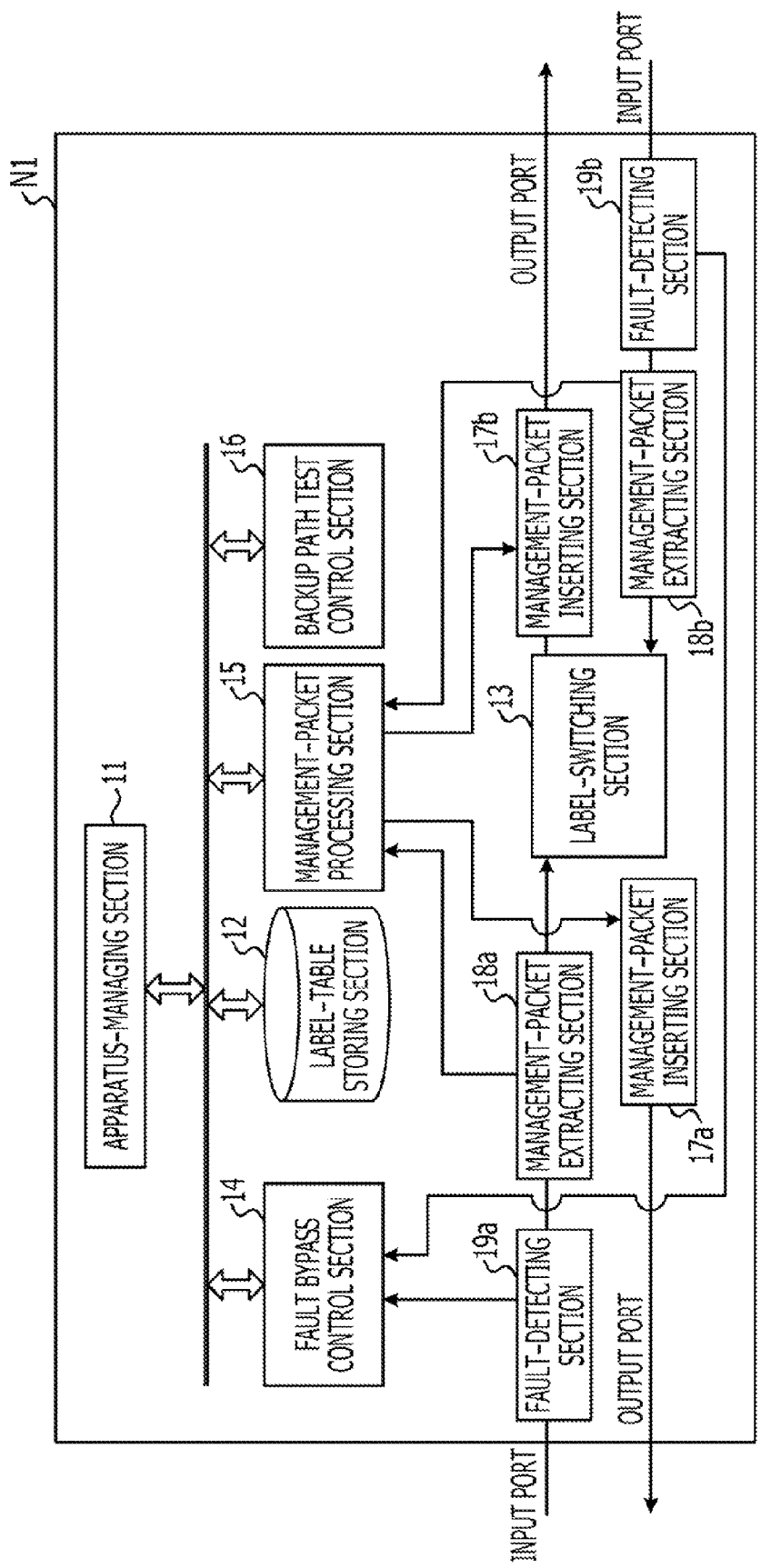
FIG. 5 is a block diagram showing the functions of the node.

FIG. 5 is a block diagram showing the functions of the node N1.

The node N1 includes the apparatus-managing section 11 and the following functional sections: a label-table storing section 12, a label-switching section 13, a fault bypass control section 14, a management-packet processing section 15, a backup path test control section 16, a management-packet inserting sections 17a and 17b, management-packet extracting sections 18a and 18b, and fault-detecting sections 19a and 19b.

The function of the apparatus-managing section 11 is implemented by the CPU 101. The label-table storing section 12 corresponds to the RAM 104a. The function of the label-switching section 13 is implemented by the NPU 104. The function of the fault bypass control section 14 is implemented by the NPU 104. The function of the management-packet processing section 15 is implemented by the NPU 104. The function of the backup path test control section 16 is implemented by the NPU 104. The functions of the management-packet inserting sections 17a and 17b are implemented by the NPU 104. The functions of the management-packet extracting sections 18a and 18b are implemented by the NPU 104. The functions of the fault-detecting sections 19a and 19b are implemented by the XFP 107a to 107d, the Ethernet® PHY 106 the NPU 104, or the NPU 104.

The input and output ports to the left of FIG. 5 are connected to the non-label-switched network 200, whereas the input and output ports to the right are connected to the node N2.

The apparatus-managing section 11 governs the individual functional sections and manages monitoring and setting of the entire node N1. Specifically, the apparatus-managing section 11 designates a point of fault for testing by the backup path test function and instructs the backup path test control section 16 to start a test.

Upon receiving test results from the backup path test control section 16, the apparatus-managing section 11 can display the test results on, for example, a monitor (not shown) connected to the node N1.

Examples of information displayed on the monitor include the start node of the backup path test, the point of fault, the end node of the backup path test, and the arrival time of a backup path test packet.

The label-table storing section 12 stores and manages labels for label switching as a table.

FIG. 6 is a diagram showing label tables used in the second embodiment.

FIG. 6 shows all label tables possessed by the nodes together. For example, a label table 12a is a label table stored in the label-table storing section 12, and a label table 22a is a label table stored in the label-table storing section of the node N2.

Each label table has a working path column and a backup path column.

Path information for the node is registered in the working path column and the backup path column. The path information includes a combination of an input port from which the node receives a packet and a label added to the received packet and a combination of a port from which the node transmits the packet and a label added to the packet to be transmitted. This path information defines where to forward the input packet and to which label to rewrite the label.

The path information registered in the label tables 12a to 82a are reflected on the packet forwarding process. For example, the working path column of the label table 12a indicates that the label added to a packet received from the port #x linked to the non-label-switched network 200 is W1 and that the output port is the port #1.

Thus, the path information registered in the label tables 12a to 82a possessed by the nodes enables high-speed label switching by hardware and therefore allows packets to be forwarded at high speed between the nodes.

Turning back to FIG. 5, the description will be continued.

The label-switching section 13 searches the label table 12a based on the port from which a packet has been received and label information contained in the packet to retrieve path information matching the input criteria. The label-switching section 13 then retrieves the output port and label indicated by the path information to forward the packet from the input port to the output port and to switch the label (label switching).

The backup path test packet TP1, which is handled as a management packet, is extracted by the management-packet extracting sections 18a and 18b. The extracted backup path test packet TP1 is sent to the management-packet processing section 15. Thus, the backup path test packet TP1 is not processed by the label-switching section 13.

When the fault-detecting sections 19a and 19b detect a fault, the fault bypass control section 14 rewrites the path information registered in the label table 12a to path information for fault bypass (fault bypass path information). This rewriting switches the path for packets received by the node N1 to the fault bypass path thereafter.

The path switched upon detection of a fault is the path where the input or output port in the path information registered in the label table 12a in a normal (non-faulty) condition matches the faulty port.

The fault bypass control section 14 stores fault bypass path information in advance.

FIG. 7 is a diagram showing the bypass path information stored in the fault bypass control sections.

In this embodiment, the fault bypass path information is presented as a table.

FIG. 7 shows fault bypass path management tables 14a to 84a possessed by the nodes together. For example, the fault bypass path management table 14a is a table stored in the fault bypass control section 14, and the fault bypass path management table 24a is a table stored in the fault bypass control section of the node N2.

Each fault bypass path management table has a port #1 fault bypass path information column and a port #2 fault bypass path information column.

For example, fault bypass path information for rewriting the working path column and the backup path column of the label table 32a is registered in the port #1 fault bypass path information column and the port #2 fault bypass path information column, respectively, of the fault bypass path management table 34a.

Thus, the fault bypass path information is not registered in advance in the label tables of nodes corresponding to a branch point where the flow is rerouted from the working path to the backup path and a point (merge point) where the flow returns from the backup path to the working path in order not to affect a flow of packets through the working path in a normal condition. For example, the fault bypass control section of the node N3, upon occurrence of a fault, rewrites the label table 32a for switching to the fault bypass path.

Turning back to FIG. 5, the description will be continued.

The fault bypass control section 14, upon accepting a query for fault bypass path information matching the criteria contained in the backup path test packet TP1 from the backup path test control section 16, searches the fault bypass path management table 14a and notifies the backup path test control section 16 about fault bypass path information matching the criteria. The criteria include the faulty port, the input port, and the label information at the input.

The process of the fault bypass control section 14 in a backup path test differs from that in the case where a fault actually occurs in that the label table 12a is not rewritten.

The management-packet processing section 15 analyzes management packets extracted by the management-packet extracting sections 18a and 18b. The management-packet processing section 15 then instructs the apparatus-managing section 11 to execute various maintenance procedures according to the contents of the management packets and, if necessary, returns a response to the apparatus-managing section 11.

In addition, upon receiving a backup path test packet TP1, the management-packet processing section 15 notifies the backup path test control section 16 about the receipt of the backup path test packet TP1. On the other hand, upon accepting an instruction to transmit a backup path test packet TP1 from the backup path test control section 16, the management-packet processing section 15 generates a backup path test packet TP1 and instructs the management-packet inserting section 17a or 17b to transmit the generated backup path test packet TP1.

The backup path test control section 16 executes generation of a backup path test packet TP1 and a instruction to transmit the backup path test packet TP1 when starting a backup path test, and executes path verification and packet forwarding or termination upon receiving a backup path test packet TP1.

Specifically, when generating a backup path test packet TP1, the backup path test control section 16 stores information indicating a pseudo point of fault designated by the apparatus-managing section 11 in a backup path test packet TP1 and instructs the management-packet processing section 15 to transmit the backup path test packet TP1.

Upon receiving a backup path test packet TP1, on the other hand, the backup path test control section 16 determines whether or not the point of fault indicated in the backup path test packet TP1 corresponds to a port of its own node. If the point of fault does not correspond to a port of its own node, the backup path test control section 16 refers to the path information stored in the label-table storing section 12 and instructs the management-packet processing section 15 to forward the backup path test packet TP1. On the other hand, if the point of fault corresponds to a port of its own node, the backup path test control section 16 queries the fault bypass control section 14 to obtain fault bypass path information and instructs the management-packet processing section 15 to forward the backup path test packet TP1 according to the fault bypass path information.

If the backup path test control section 16 receives a backup path test packet TP1 in the case where the node N1 is the end node of the backup path test, it notifies the apparatus-managing section 11 about the result of the backup path test.

The management-packet inserting sections 17a and 17b receive management packets generated by the management-packet processing section 15 and insert them into the designated output port before transmission.

The management-packet extracting sections 18a and 18b extract management packets from the input port and pass them to the management-packet processing section 15.

The fault-detecting sections 19a and 19b detect a link fault at the input or output port and notify the fault bypass control section 14.

The nodes N2 to N8 have substantially the same functions as the node N1. In the description below, the functions of the nodes will be described in association with the reference numerals of the nodes. For example, the functions of the node N2 will be described as an apparatus-managing section 21, a label-table storing section 22, a label-switching section 23, a fault bypass control section 24, a management-packet processing section 25, a backup path test control section 26, management-packet inserting sections 27a and 27b, management-packet extracting sections 28a and 28b, and fault-detecting sections 29a and 29b. In addition, the functions of the node N3 will be described as an apparatus-managing section 31, . . . , fault-detecting sections 39a and 39b.

Next, the process of the backup path test control section 16 when starting a backup path test will be described.

Figure 8:
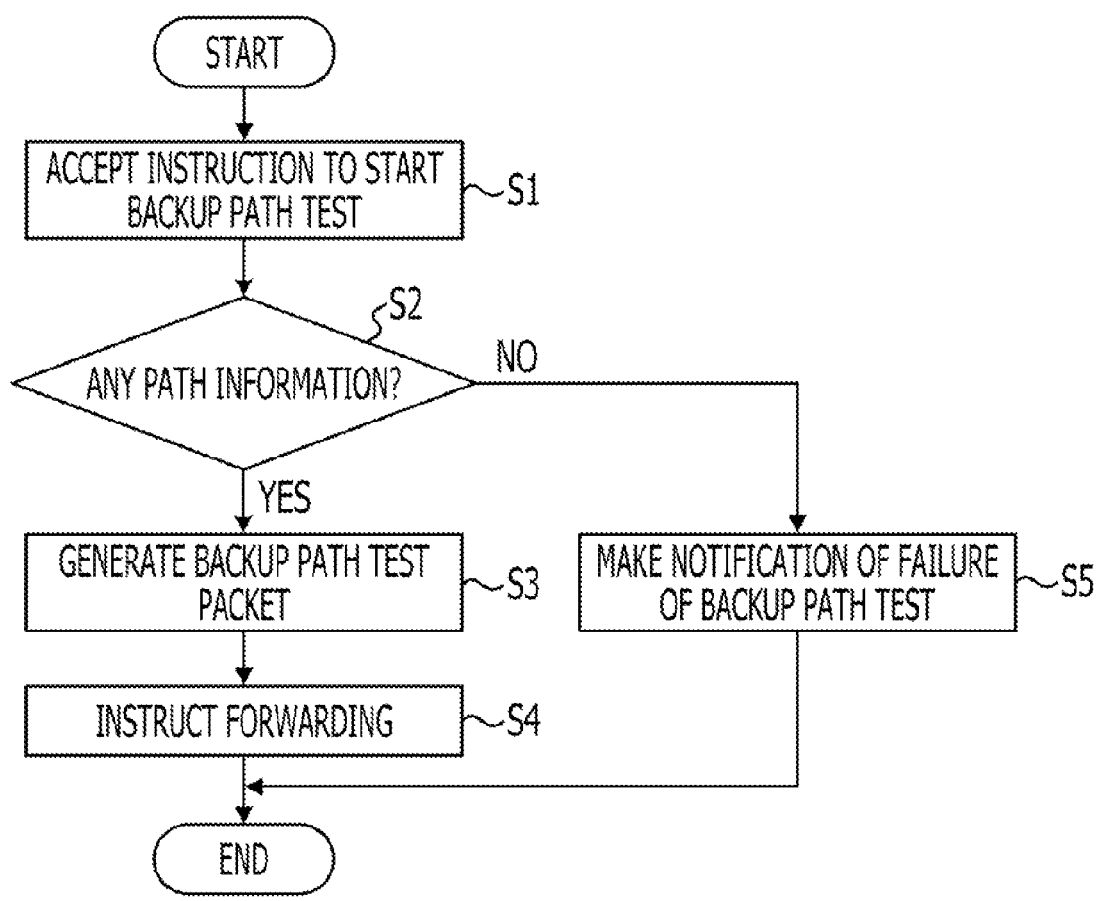
FIG. 8 is a flowchart showing the process of a backup path test control section when starting a backup path test.

FIG. 8 is a flowchart showing the process of the backup path test control section 16 when starting a backup path test in the second embodiment.

Step S1
The backup path test control section 16 accepts an instruction to start a backup path test, with the target path and the point of fault designated by the apparatus-managing section 11. The process then goes to Step S2.

Step S2
The backup path test control section 16 searches the target path column of the label table 12a to determine whether or not there is any path information. If there is any path information ("Yes" in Step S2), the process goes to Step S3. If there is no path information ("No" in Step S2), the process goes to Step S5.

Step S3
The backup path test control section 16 generates a backup path test packet TP1 based on the path information. The process then goes to Step S4.

Step S4
The backup path test control section 16 instructs the management-packet processing section 15 to forward the generated backup path test packet TP1. The backup path test control section 16 then terminates the process.

Step S5
The backup path test control section 16 notifies the apparatus-managing section 11 about the failure to start a backup path test. The backup path test control section 16 then terminates the process.

This is the end of the description of the process in FIG. 8.

Next, the process of the nodes N2 to N8 in a backup path test will be described. As a representative example of the nodes N2 to N8, the process of the node N2 in a backup path test will be described.

Figure 9:
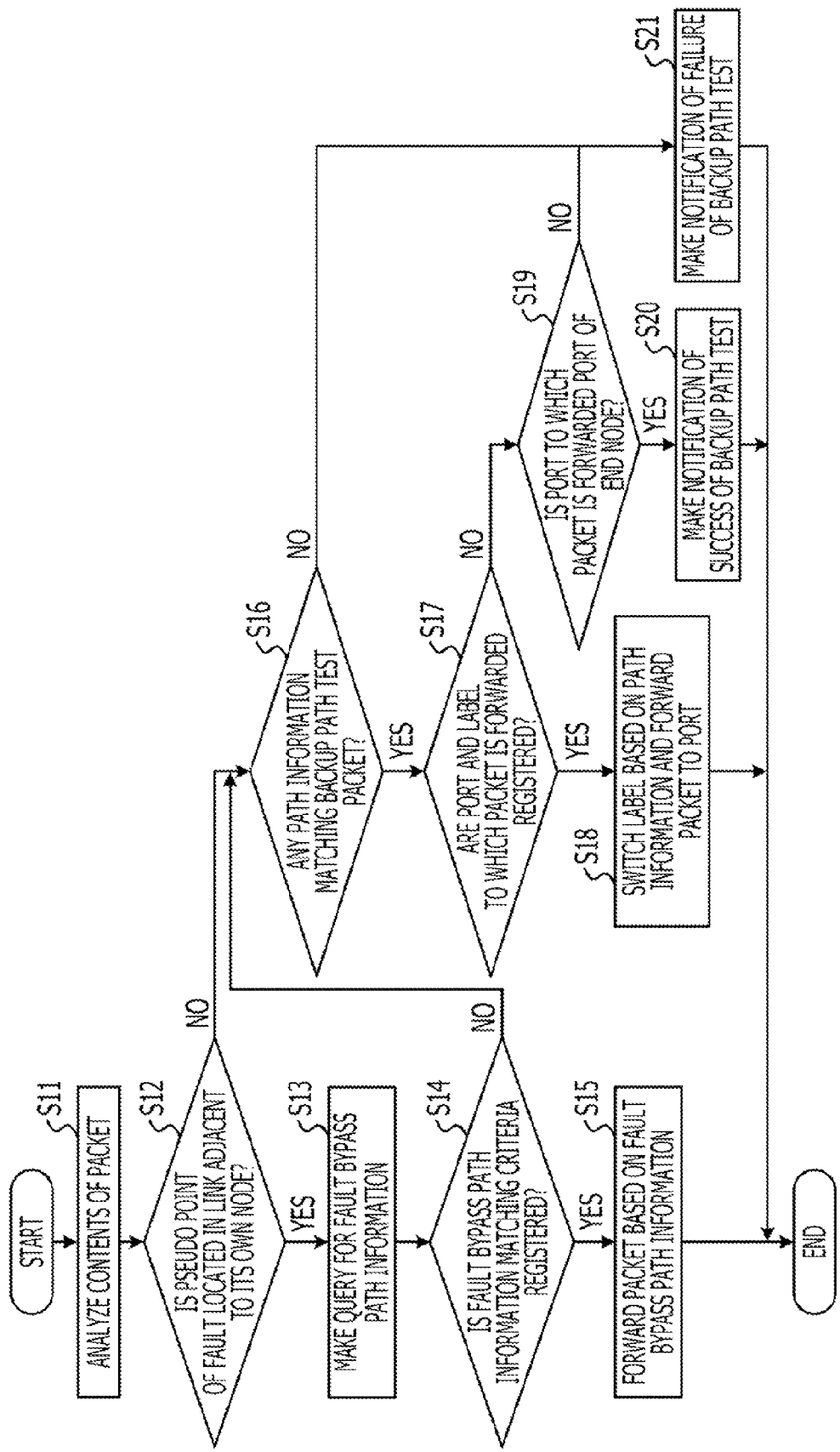
FIG. 9 is a flowchart showing the process of each node in a backup path test.

FIG. 9 is a flowchart showing the process of each node in a backup path test.

Step S11
The management-packet processing section 25 receives a backup path test packet TP1 extracted by the management-packet extracting sections 28a and analyzes the contents thereof. The process then goes to Step S12.

Step S12
Based on the result of the analysis in Step S11, the backup path test control section 26 determines whether or not the pseudo point of fault is located in a link adjacent to its own node. If the backup path test control section 26 determines that the pseudo point of fault is located in a link adjacent to its own node ("Yes" in Step S12), the process goes to Step S13. If the backup path test control section 26 determines that the pseudo point of fault is not located in a link adjacent to its own node ("No" in Step S12), the process goes to Step S16.

Step S13
The backup path test control section 26 queries the fault bypass control section 24 for fault bypass path information by notifying it about the faulty port, the receiving port, and the received label. The process then goes to Step S14.

Step S14
The fault bypass control section 24 refers to the fault bypass path management table 24a to determine whether or not fault bypass path information matching the criteria is registered in the fault bypass path management table 24a. If fault bypass path information matching the criteria is registered in the fault bypass path management table 24a ("Yes" in Step S14), the process goes to Step S15. If no fault bypass path information matching the criteria is registered in the fault bypass path management table 24a ("No" in Step S14), the process goes to Step S16.

Step S15
Based on the settings of the path information, the backup path test control section 26 switches the path from the working path to the backup path or from the backup path to the working path and instructs the management-packet processing section 25 to forward the backup path test packet TP1. This node then terminates the process.

Step S16
The fault bypass control section 24 searches the label table 22a to determine whether or not there is any path information matching the port and label from which the backup path test packet TP1 has been received. If there is matching path information ("Yes" in Step S16), the process goes to Step S17. If there is no matching path information ("No" in Step S16), the process goes to Step S21.

Step S17
The fault bypass control section 24 determines whether or not the port and label to which the backup path test packet TP1 is forwarded are registered in the matching path information obtained in Step S16. If the port and label to which the backup path test packet TP1 is forwarded are registered ("Yes" in Step S17), the process goes to Step S18. If the port and label to which the backup path test packet TP1 is forwarded are not registered ("No" in Step S17), the process goes to Step S19.

Step S18

The fault bypass control section 24 rewrites the label of the backup path test packet TP1 to the label registered in the matching path information obtained in Step S16 and forwards the backup path test packet TP1 to the port registered in the matching path information obtained in Step S16. This node then terminates the process.

Step S19

The backup path test control section 26 determines whether or not the port to which the backup path test packet TP1 is forwarded is a port of the end node of the network system 100. If the port to which the backup path test packet TP1 is forwarded is a port of the end node of the network system 100 ("Yes" in Step S19), the process goes to Step S20. If the port to which the backup path test packet TP1 is forwarded is not a port of the end node of the network system 100 ("No" in Step S19), the process goes to Step S21.

Step S20

The backup path test control section 26 notifies the apparatus-managing section 21 about the success of the backup path test. This node then terminates the process.

Step S21

The backup path test control section 26 notifies the apparatus-managing section 21 about the failure of the backup path test. This node then terminates the process.

This is the end of the description of the process in FIG. 9.

Next, the operation of the network system 100 when a fault actually occurs between the port #2 of the node N3 and the port #1 of the node N4 will be described.

Figure 10:
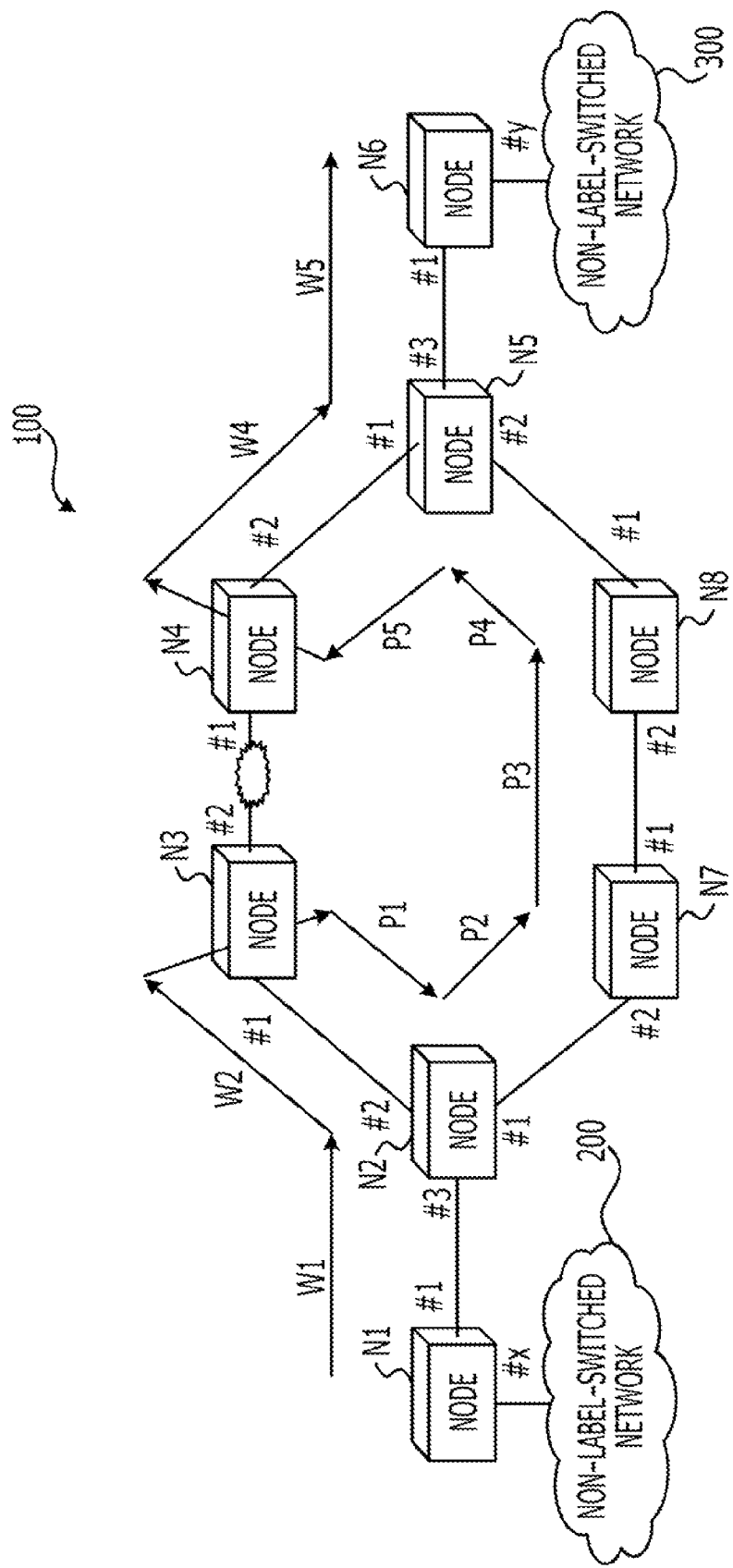
FIG. 10 is a diagram illustrating the operation of the network system when a fault actually occurs between nodes.
Figure 11:
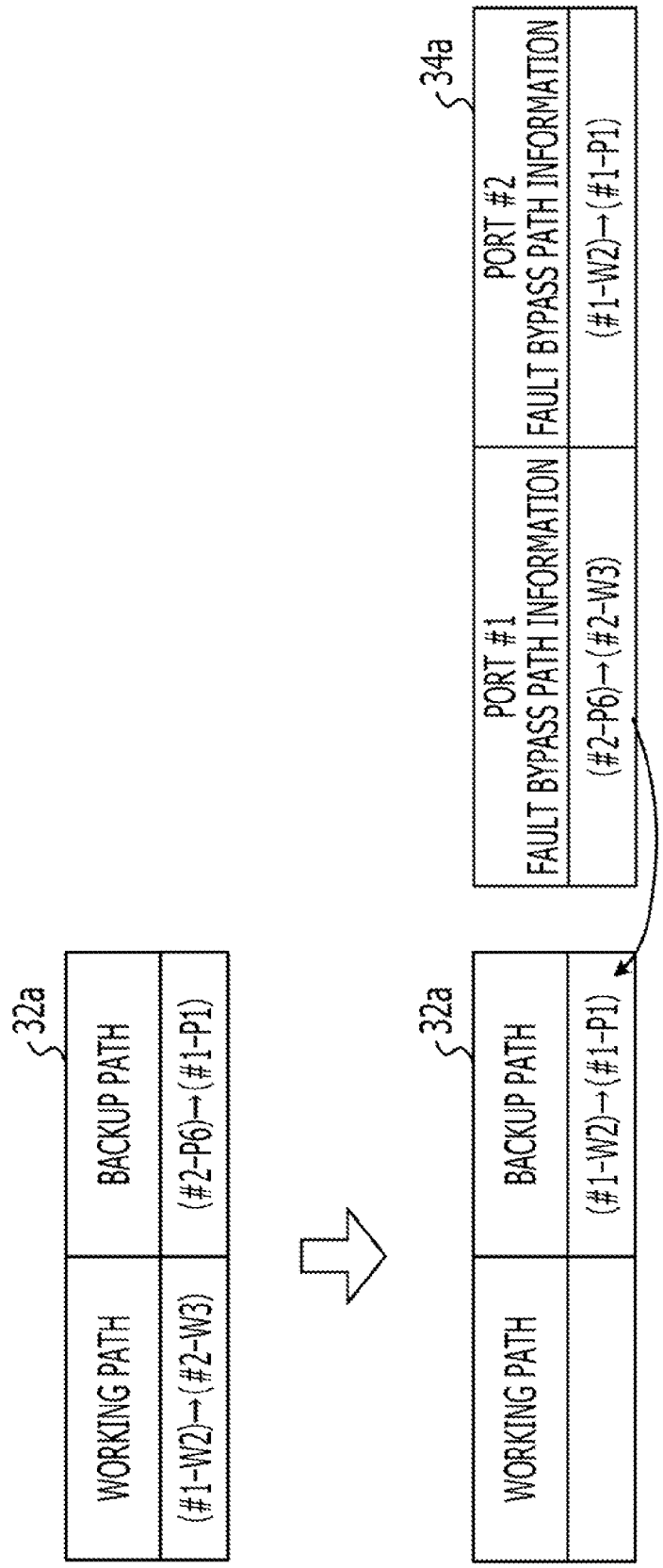
FIG. 11 is a diagram illustrating how a label table is rewritten when a fault actually occurs between nodes.
Figure 12:
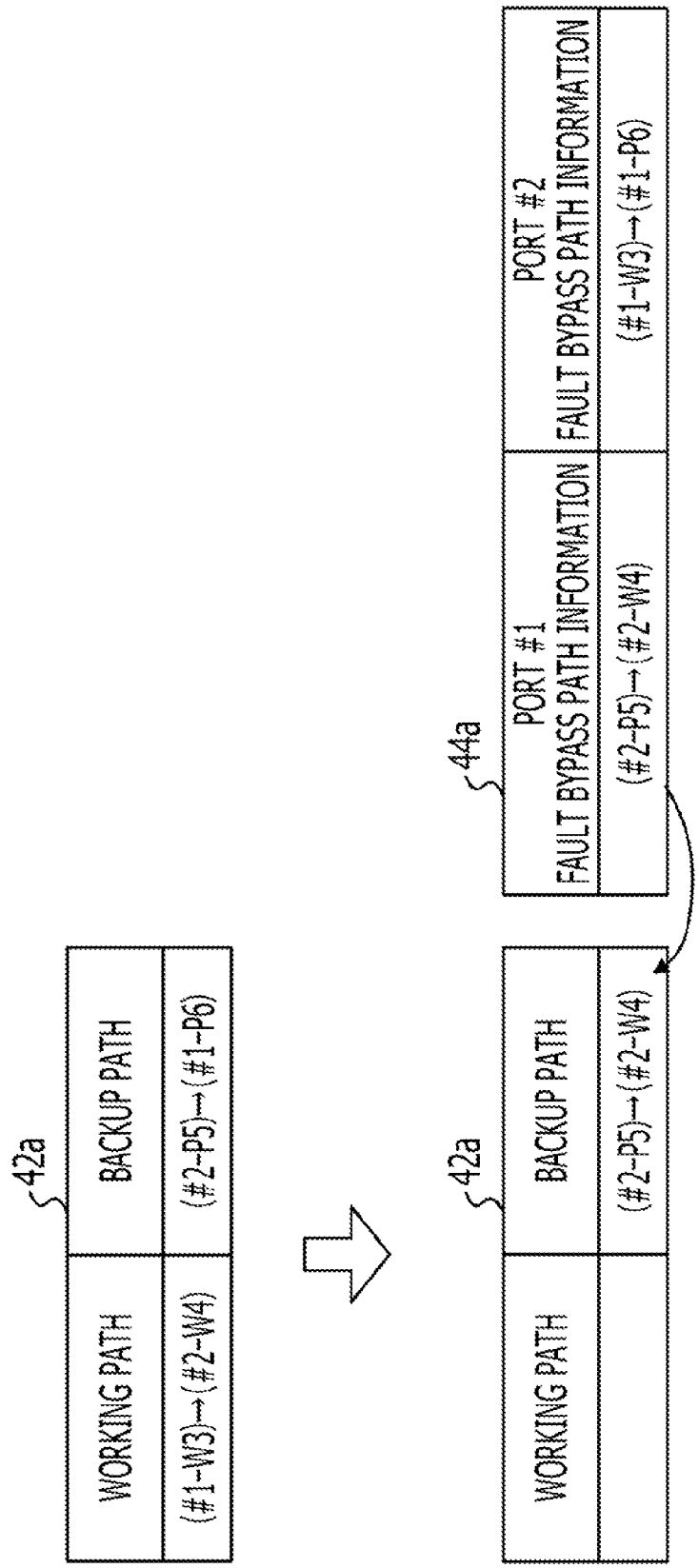
FIG. 12 is a diagram illustrating how a label table is rewritten when a fault actually occurs between nodes.

FIG. 10 is a diagram illustrating the operation of the network system 100 when a fault actually occurs between the nodes N3 and N4. FIGS. 11 and 12 are diagrams illustrating how label tables are rewritten when a fault actually occurs between the nodes N3 and N4.

The node N3 operates as follows. If the fault-detecting section 39a connected to the port #2 of the node N3 detects a fault, as shown in FIG. 11, the fault bypass control section 34 rewrites the path information registered in the backup path column of the label table 32a to the fault bypass path information registered in the port #2 fault bypass path information column of the fault bypass path management table 34a. At substantially the same time, the fault bypass control section 34 deletes the path information registered in the working path column of the label table 32a. Thus, the path is switched from the working path to the backup path to reroute packets to the backup path.

The node N4, on the other hand, operates as follows. If the fault-detecting section 49b connected to the port #1 of the node N4 detects a fault, as shown in FIG. 12, the fault bypass control section 44 rewrites the path information registered in the backup path column of the label table 42a to the fault bypass path information registered in the port #1 fault bypass path information column of the fault bypass path management table 44a. At substantially the same time, the fault bypass control section 44 deletes the path information registered in the working path column of the label table 42a. Thus, the path is switched from the backup path to the working path so that packets return to the working path.

The other nodes N1, N2, and N5 to N8 forward packets in substantially the same way as in an non-faulty condition with the existing working and backup path settings registered in the label tables of the nodes, thus forming the fault bypass path shown in FIG. 10.

Next, the operation of the network system 100 in a backup path test will be described.

Figure 13:
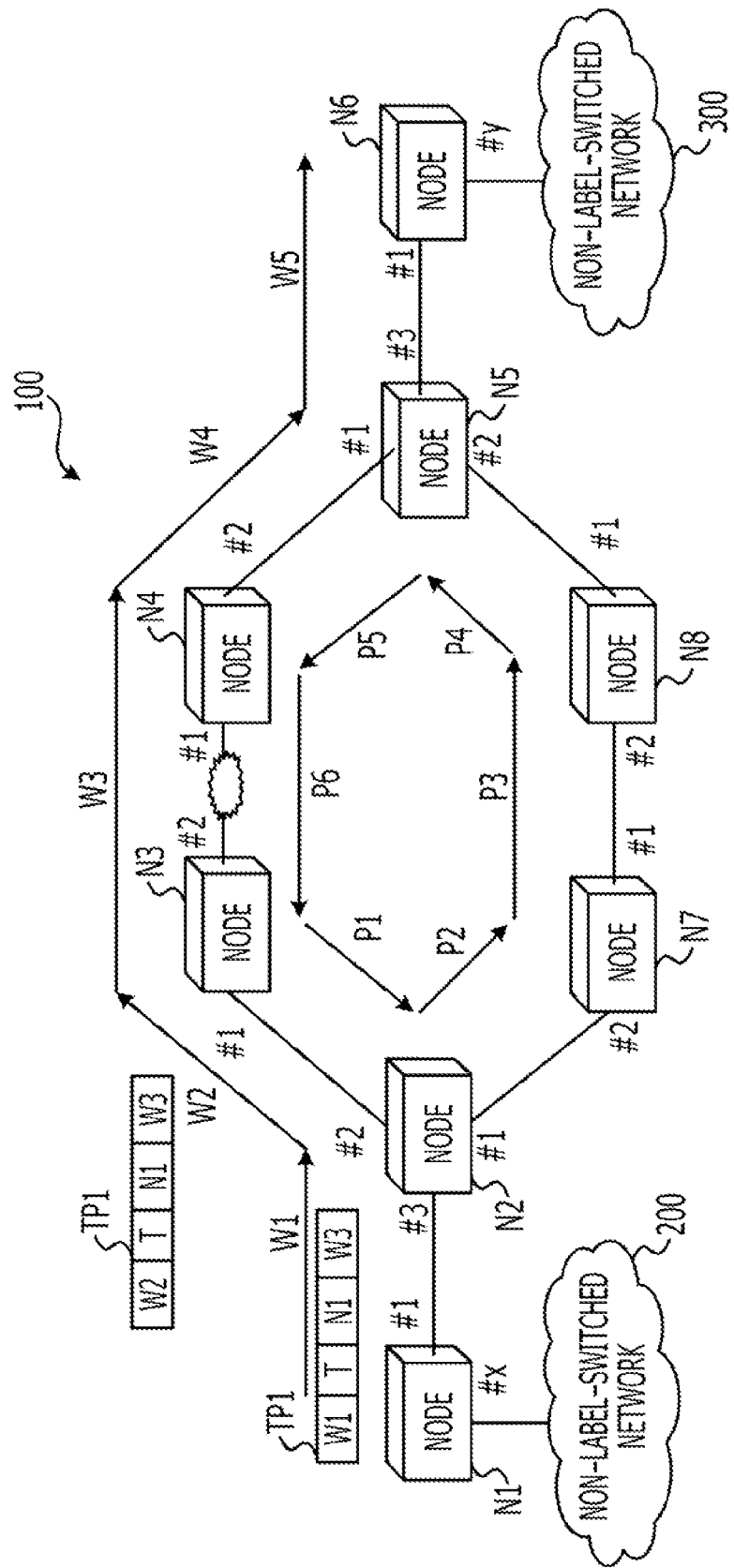
FIG. 13 is a diagram showing the state where the start node of a working path has started a backup path test.

FIG. 13 is a diagram showing the state where the start node of the working path, namely, the node N1, has started a backup path test.

In this example, assuming that a fault has occurred in the link between the nodes N3 and N4, a pseudo point of fault is set between the nodes N3 and N4.

As shown in FIG. 13, the node N1 generates a backup path test packet TP1. Specifically, the node N1 generates a backup path test packet TP1 containing "T" in the field F2, "N1" in the field F3, and "W3" in the field F4, with "W1" added to the field F1. The management-packet processing section 15 of the node N1 then transmits the generated backup path test packet TP1 from the port #1 of the node N1.

Here, the information stored in the field F4 is represented as "W3," which indicates the working link between the nodes N3 and N4 (working inter-node transmission line), for illustration purposes; in practice, the information stored in the field F4 is "N3#2, N4 #1," rather than "W3," as in the example of test packet in FIG. 3.

The backup path test control section 26 of the node N2 that has received the backup path test packet TP1 examines the contents of the backup path test packet TP1 to determine whether or not the point of fault is adjacent to its own node N2. In this example, because the field F4 contains "W3," the backup path test control section 26 of the node N2 determines that the point of fault is not adjacent to its own node N2.

The backup path test control section 26 of the node N2 instructs the management-packet processing section 25 to forward the backup path test packet TP1 to the next node based on the path information registered in the label table 22a. Specifically, the backup path test control section 26 switches the label in the field F1 of the backup path test packet TP1 from "W1" to "W2" based on the path information for the working path in the label table 22a shown in FIG. 6, namely, "(#3-W1)→(#2-W2)." The management-packet processing section 25 then transmits the backup path test packet TP1 from the port #2.

Figure 14:
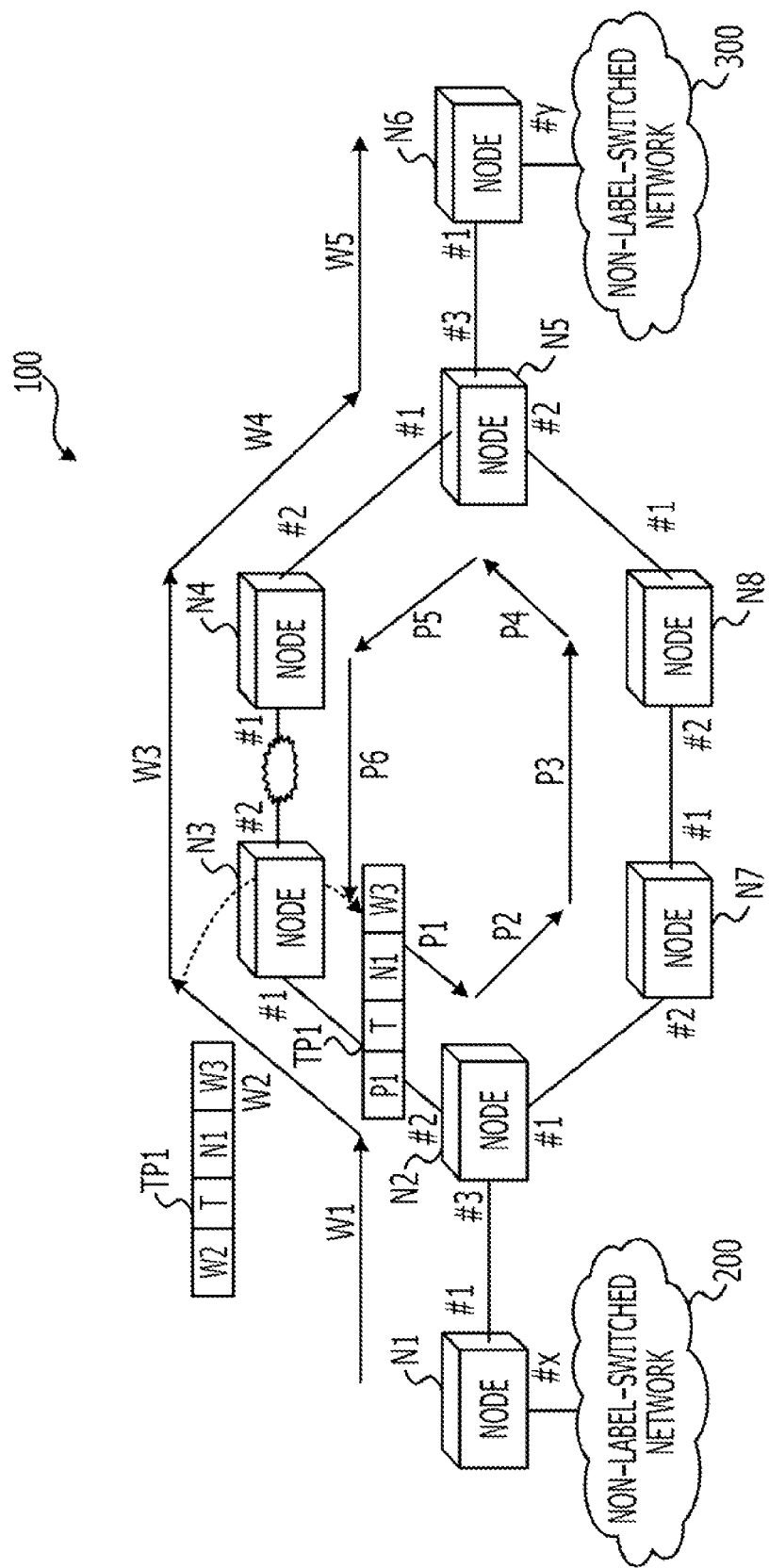
FIG. 14 is a diagram showing the state where a backup path test packet has reached a node adjacent to a point of fault.

FIG. 14 is a diagram showing the state where the backup path test packet TP1 has reached one of the nodes adjacent to the point of fault (pseudo point of fault), namely, the node N3.

The backup path test control section 36 of the node N3 examines the contents of the backup path test packet TP1 to determine whether or not the point of fault is adjacent to its own node N3. In this example, because the field F4 contains "W3," the backup path test control section 36 determines that the point of fault contained in the backup path test packet TP1 is located in a link (port) adjacent to the node N3. Accordingly, the backup path test control section 36 queries the fault bypass control section 34 for the fault bypass path for the backup path test packet TP1 and instructs the management-packet processing section 35 to forward the backup path test packet TP1 to the fault bypass path obtained by the query.

Specifically, based on the information in the backup path test packet TP1, the bypass path test control section 36 of the node N3 queries the fault bypass control section 34 for the backup path using the following criteria: faulty port=#2, input port=#1, label=W2. Because the fault bypass path information registered in the port #2 fault bypass path information column of the fault bypass path management table 34a, namely, "(#1-W2)→(#1-P1)," matches the input port and the label, the fault bypass control section 34 of the node N3 returns that fault bypass path information to the backup path test control section 36. The backup path test control section 36 of the node N3 then instructs the management-packet processing section 35 to switch the label of the backup path test packet TP1 from "W2" to "P1" and transmits it from the port #1.

The fault bypass control section 34 of the node N3 does not rewrite the information in the label table 32a for switching to the backup path; therefore, only the received backup path test packet TP1 is forwarded to the backup path. As for packets other than the backup path test packet TP1, the label-switching section 33 of the node N3 switches the label from "W2" to "W3" and forwards them to the working path, namely, the node N4.

Figure 15:
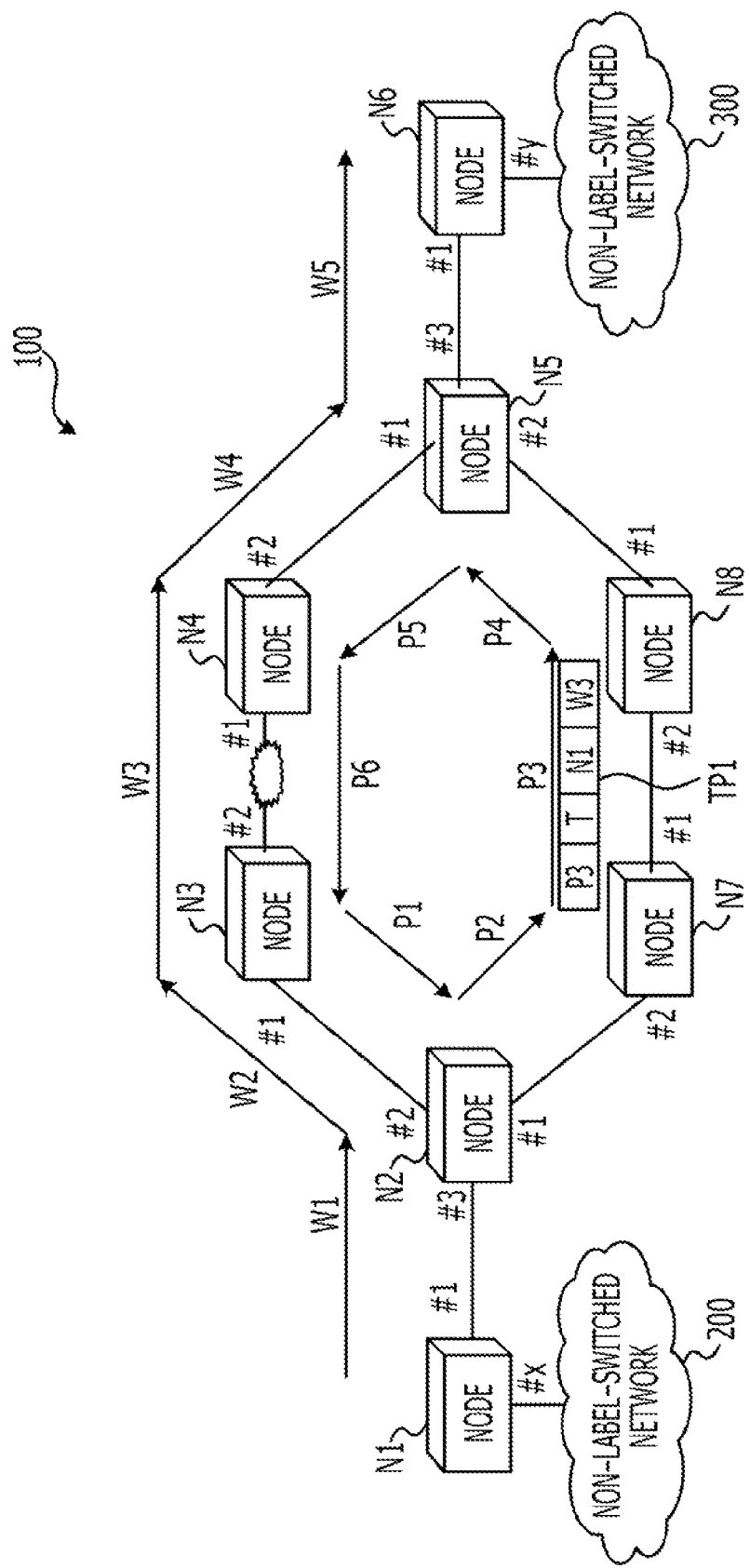
FIG. 15 is a diagram showing the state where the backup path test packet rerouted to the backup path is sequentially forwarded through the nodes of the backup path.

FIG. 15 is a diagram showing the state where the backup path test packet TP1 rerouted to the backup path as above is sequentially forwarded through the nodes on the backup path.

Upon receiving the backup path test packet TP1, the nodes N2, N7, N8, and N5 examine the contents of the backup path test packet TP1. Because the nodes N2, N7, N8, and N5 are not adjacent to the point of fault, they forward the backup path test packet TP1 to the next node based on the path information for the backup path registered in advance in the label tables of the nodes.

Figure 16:
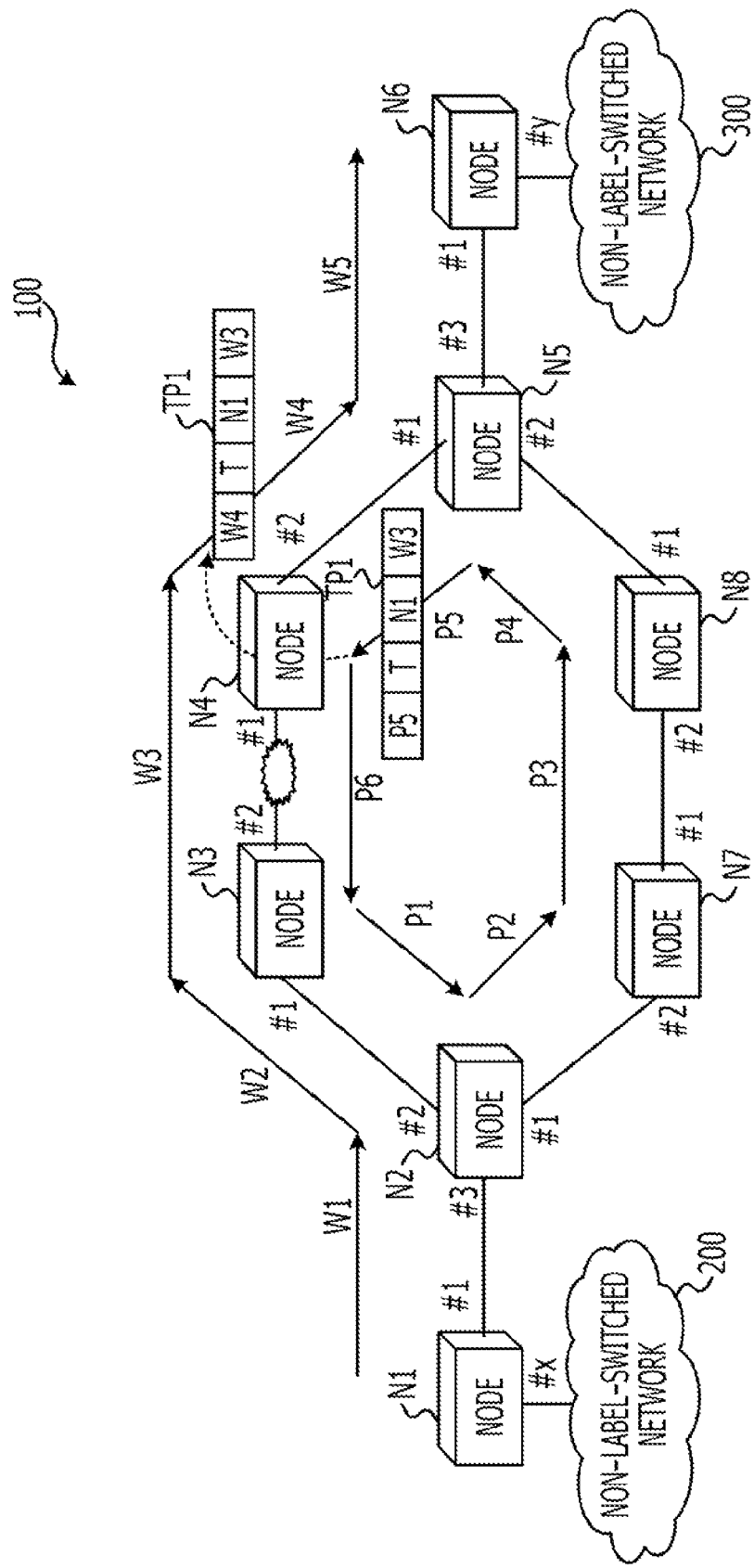
FIG. 16 is a diagram showing the state where the backup path test packet forwarded through the backup path has reached a node adjacent to the point of fault.

FIG. 16 is a diagram showing the state where the backup path test packet TP1 forwarded through the backup path has reached the other node adjacent to the point of fault, namely, the node N4.

The backup path test control section 46 of the node N4 that has received the backup path test packet TP1 recognizes that the point of fault indicated by the backup path test packet TP1 is located in a link (port) adjacent to the node N4. The backup path test control section 46 then queries the fault bypass control section 44 for the fault bypass path for the received backup path test packet TP1 and instructs the management-packet processing section 45 to forward the backup path test packet TP1 to the fault bypass path contained in the response.

Specifically, based on the information in the backup path test packet TP1, the backup path test control section 46 queries the fault bypass control section 44 for the fault bypass path using the following criteria: faulty port=#1, input port=#2, label=P5. Because the fault bypass path information registered in the port #1 fault bypass path information column of the fault bypass path management table 44a, namely, "(#2-P5)→(#2-W4)," matches the input port and the label, the fault bypass control section 44 returns that fault bypass path information to the backup path test control section 46. The backup path test control section 46 of the node N4 then instructs the management-packet processing section 45 to switch the label of the backup path test packet TP1 from "P5" to "W4" and transmits it from the port #2.

Figure 17:
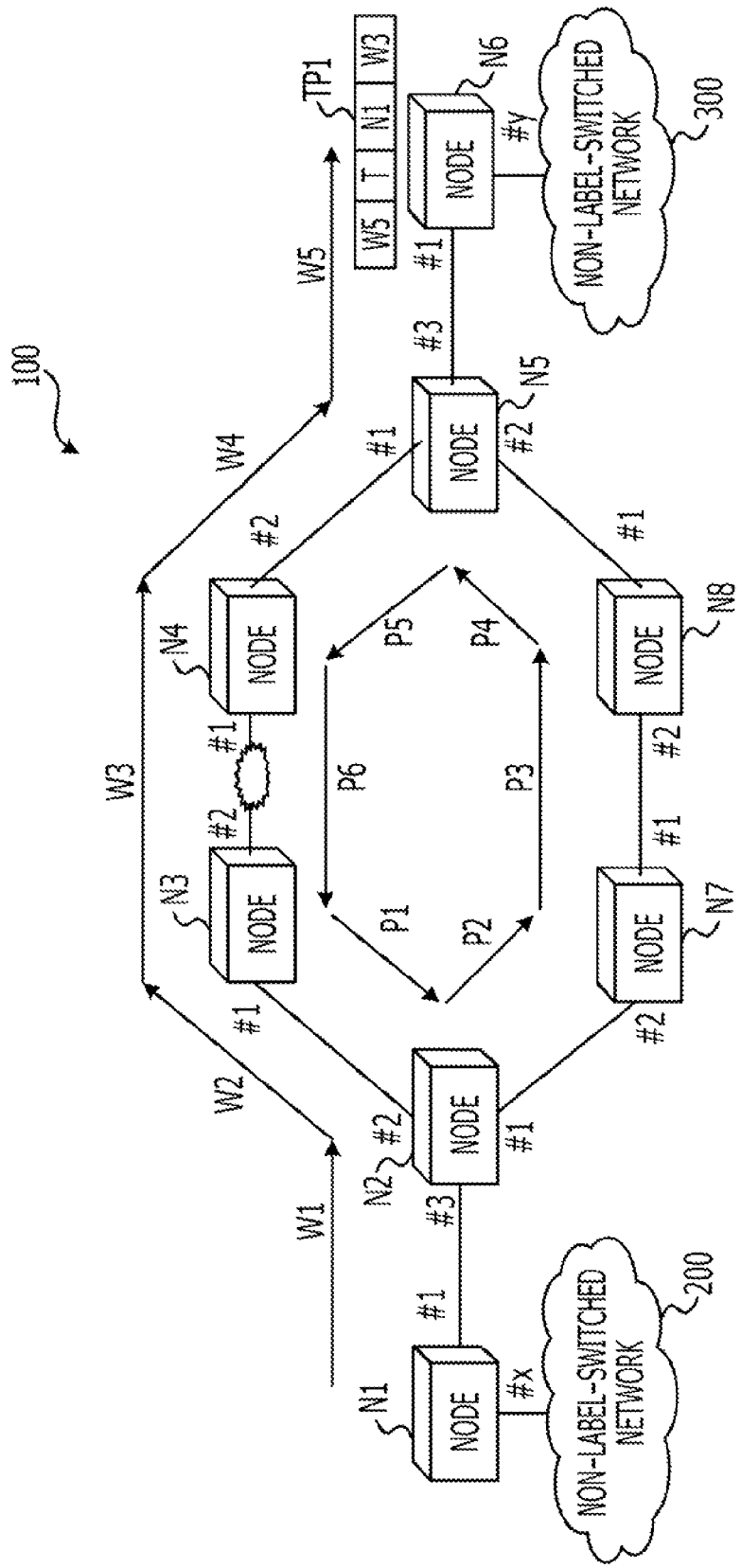
FIG. 17 is a diagram showing the state where the backup path test packet returned to the working path has reached a path end node through the rest of the working path.

FIG. 17 is a diagram showing the state where the backup path test packet TP1 rerouted from the backup path to the working path at the node N4 has reached the path end node, namely, the node N6, through the working path.

Upon receiving the backup path test packet TP1, the management-packet processing section 65 of the node N6 that has detected it notifies the apparatus-managing section 61 about the arrival of the backup path test packet TP1. The apparatus-managing section 61 of the node N6 displays the success of the backup path test on, for example, an external terminal.

As described above, the network system 100 generates a backup path test packet TP1 at the start node of the path, forwards the backup path test packet TP1 through the backup path such that it bypasses the designated pseudo point of fault, and finally returns the test result at the end node of the path. This allows verification of the availability of the backup path.

In addition, the network system 100 does not affect normal service traffic flowing through the working path during a backup path test, thus permitting verification of the availability of the backup path during operation. This allows the availability of the backup path to be easily verified, thus improving the reliability of the network. It is also possible to verify the normality of the label tables registered in the nodes and the normality of the backup path information registered in the nodes.

Third Embodiment

Next, a network system according to a third embodiment will be described.

For the network system according to the third embodiment, differences from the second embodiment described above will be mainly described, and common features will not be described here.

In the second embodiment, a method for carrying out a backup path test on a path in one direction, that is, from the start node to the end node of the working path, has been described.

In most cases, however, a path through which traffic is forwarded over a network has a two-way flow between two end nodes, and the same path is set up for both upstream and downstream directions. In such cases, it would be more convenient if the two directions, namely, the upstream and downstream directions, could be simultaneously tested for the same point of fault.

A network system 100 according to the third embodiment is a system that allows the test to be also automatically carried out on the path in the reverse direction with respect to the forward direction, that is, the direction of the path in the second embodiment.

The network system 100 according to this embodiment differs from that according to the second embodiment in the type of information contained in a backup path test packet.

Figure 18:
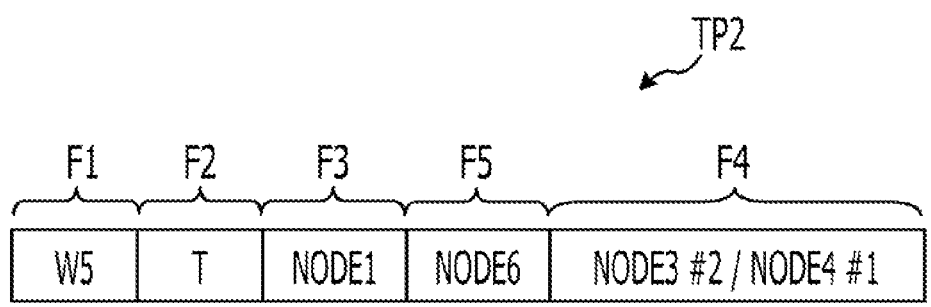
FIG. 18 is a diagram showing a format for a backup path test packet used in a third embodiment.

FIG. 18 is a diagram showing a format for a backup path test packet used in the third embodiment.

In this embodiment, the backup path test control section 16 of the node N1 generates a backup path test packet TP2 having an additional field F5 for storing information identifying the end node, which is used to notify the start node about the arrival of the backup path test packet TP2 at the end node by sending a return packet. The field F5 contains no information (empty) until the backup path test packet TP2 reaches the end node.

Figure 19:
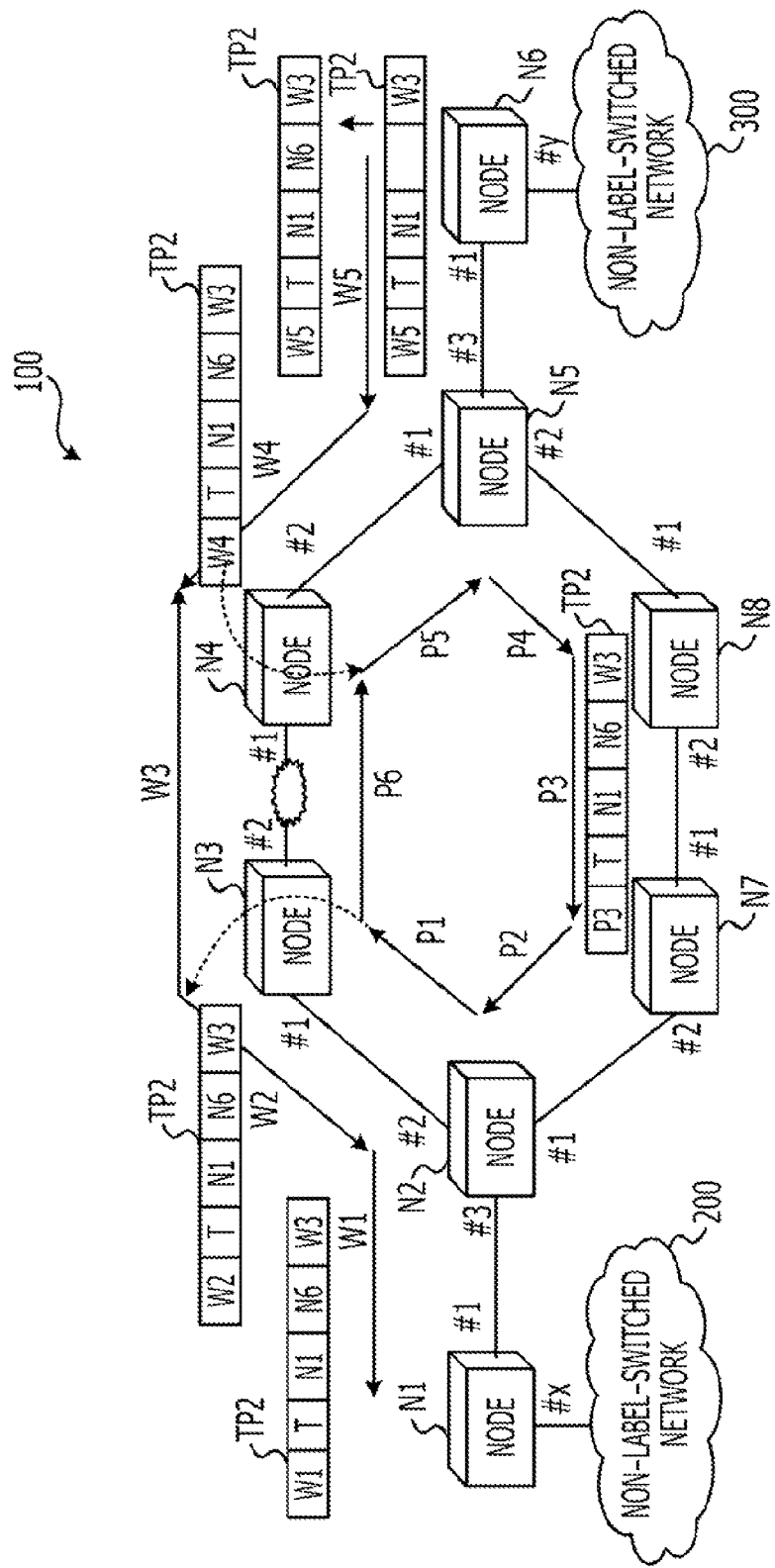
FIG. 19 is a diagram illustrating the operation of a network system according to the third embodiment in a backup path test.

FIG. 19 is a diagram illustrating the operation of the network system 100 according to the third embodiment in a backup path test.

The operation and path of the backup path test packet TP2 from the node N1 to the node N6 in the backup path test is substantially the same as those of the second embodiment except that the node N1 transmits the backup path test packet TP2 when starting the test. The path of the backup path test packet TP2 from the node N1 to the node N6 is hereinafter referred to as "outbound path."

When the end node, namely, the node N6, receives a backup path test packet TP2, it returns the backup path test packet TP2 to the node N1. Specifically, the backup path test control section 66 stores the same information as the backup path test packet TP2 received by the node N6 in the field F2 for storing the type of packet to be returned and the field F4 for storing the point of fault. In addition, the backup path test control section 66 stores "N6" in the field F5 for storing the end node, which is empty upon receipt, as information identifying the end node, namely, the node N6. The backup path test control section 66 then adds the label "W5" and transmits the backup path test packet TP2 from the port #1 of the node N6.

The backup path test packet TP2 transmitted by the node N6 is forwarded through the nodes on the same path as the outbound path, as in the description of the outbound path, in the opposite direction. The backup path test packet TP2 passes through the backup path based on the path information in the transit nodes and finally returns to the node N1 unless there is any problem with the circuit or settings.

The management-packet processing section 15 of the node N1 that has received the backup path test packet TP2 can determine the arrival of the backup path test packet TP2 at the end node by examining the field F5 of the backup path test packet TP2. The management-packet processing section 15 then notifies the apparatus-managing section 11 about the arrival of the backup path test packet TP2. The apparatus-managing section 11 displays the success of the backup path test on, for example, an external terminal.

The node N1 does not return the backup path test packet TP2 because "N1" is stored in the field F3 for storing information identifying the node that has started the transmission. This prevents the backup path test packet TP2 returned to the node N1, which started the test, from being retransmitted (playing-catch processing).

The network system 100 according to the third embodiment has substantially the same advantages as that according to the second embodiment.

In the network system 100 according to the third embodiment, additionally, the node N1 can carry out a backup path test on the paths in both directions between the nodes N1 and N6.

Fourth Embodiment

Next, a network system according to a fourth embodiment will be described.

For the network system according to the fourth embodiment, differences from the second embodiment described above will be mainly described, and common features will not be described here.

In the second embodiment, a single point on the circuit is designated as a point of fault in the network; the fourth embodiment differs from the second embodiment in that a backup path test is carried out for a fault in a node or faults in a plurality of segments. If a fault occurs in a node, for example, the paths on both sides of the faulty node become unavailable.

Figure 20:
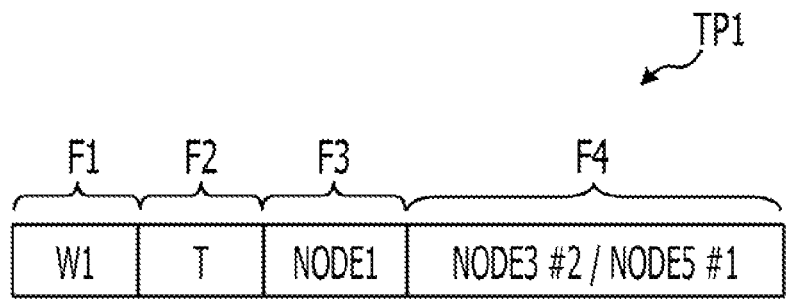
FIG. 20 is a diagram showing a format for a backup path test packet used in a fourth embodiment.

FIG. 20 is a diagram showing a format for a backup path test packet used in the fourth embodiment.

In this embodiment, the backup path test control section 16 of the node N1 designates two pseudo points of fault in different links in the field F4 of the backup path test packet TP1 for storing a pseudo point of fault.

Each node determines whether or not each pseudo point of fault contained in the received backup path test packet TP1 is adjacent to that node.

Figure 21:
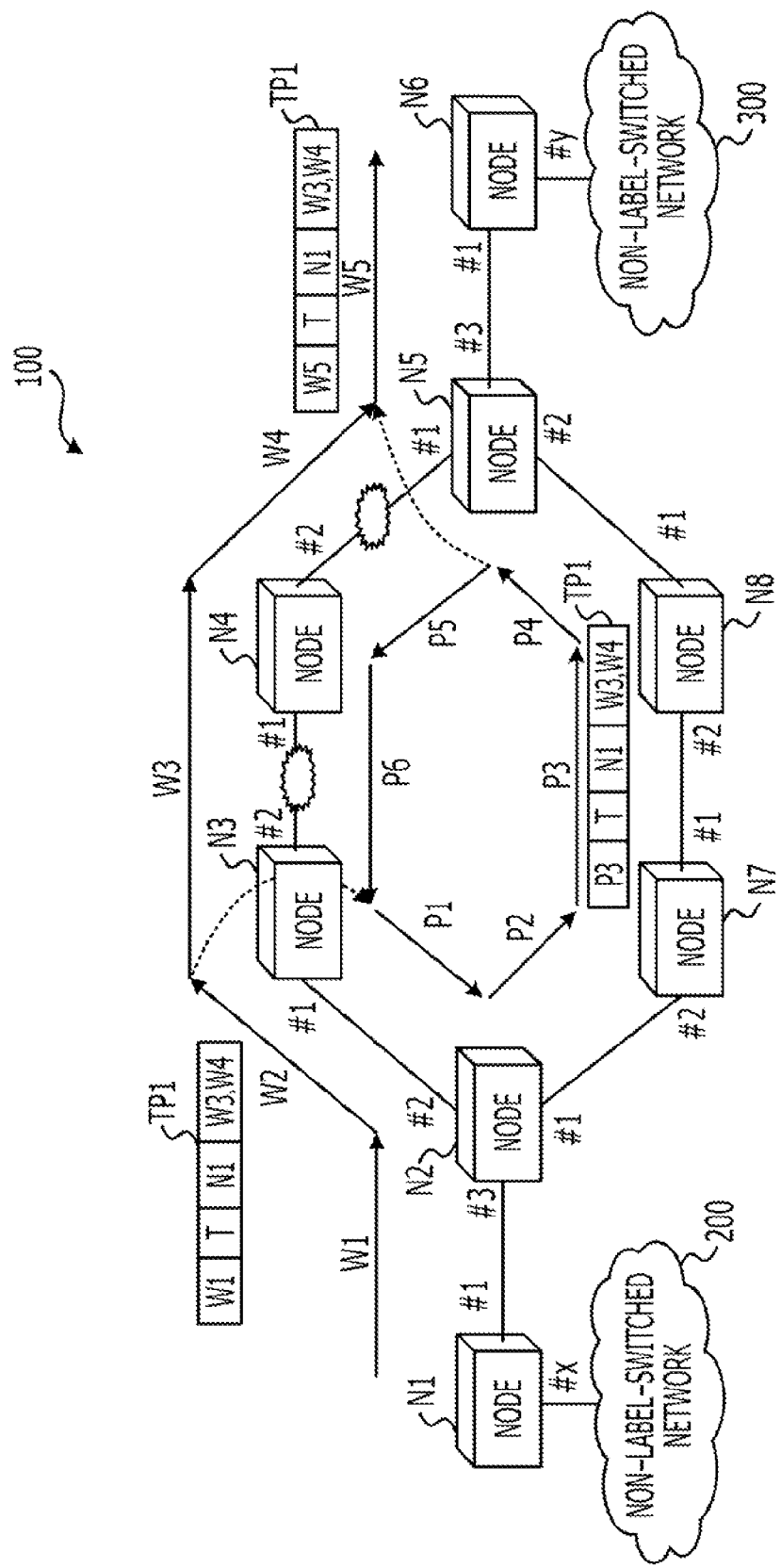
FIG. 21 is a diagram showing the operation of a network system according to the fourth embodiment in a backup path test.

FIG. 21 is a diagram showing the operation of the network system according to the fourth embodiment in a backup path test.

FIG. 21 shows an example of a backup path test for a fault in the node N4 or two circuit faults between the nodes N3 and N4 and between the nodes N4 and N5.

The backup path test control section 16 of the node N1, which is the start node of the working path, generates a backup path test packet TP1 containing "T" in the field F2, "Node1" in the field F3, and two points of fault, namely, "W3 (Node#2), W4 (Node5 #1)," in the field F4, with "W1" stored in the field F1. The management-packet processing section 15 of the node N1 then transmits the generated backup path test packet TP1 from the port #1 of the node N1.

The backup path test control section 26 of the node N2 that has received the backup path test packet TP1 examines (detects) the contents of the backup path test packet TP1 to determine whether or not the points of fault are adjacent to its own node N2. In this example, because the field F4 contains "W3," the backup path test control section 26 of the node N2 determines that the points of fault are not adjacent to its own node N2.

The backup path test control section 26 of the node N2 rewrites the label from "W1" to "W2" based on the path information registered in the working path column of the label table 22a. The management-packet processing section 25 of the node N2 then transmits the backup path test packet TP1 to the next node.

The backup path test control section 36 of the node N3 that has received the backup path test packet TP1 examines the contents of the backup path test packet TP1 to determine whether or not the points of fault are adjacent to its own node N3. In this example, because the field F4 contains "W3," which is one of the points of fault indicated by the backup path test packet TP1, the backup path test control section 36 of the node N3 determines that one of the points of fault contained in the backup path test packet TP1 is located in a link (port) adjacent to the node N3.

The backup path test control section 36 of the node N3 then queries the fault bypass control section 34 about the fault bypass path for the backup path test packet TP1 and instructs the management-packet processing section 35 to forward the backup path test packet TP1 based on the port and label indicated by the fault bypass path information obtained by the query.

The backup path test control section 56 of the node N5 that has received the backup path test packet TP1 examines the contents of the backup path test packet TP1 to determine whether or not the points of fault are adjacent to its own node N5. In this example, because the field F4 contains "W4," which is one of the points of fault indicated by the backup path test packet TP1, the backup path test control section 56 of the node N5 determines that one of the points of fault contained in the backup path test packet TP1 is located in a link (port) adjacent to the node N5.

The backup path test control section 56 of the node N5 then queries the fault bypass control section 54 about the fault bypass path for the backup path test packet TP1 and instructs the management-packet processing section 55 to forward the backup path test packet TP1 based on the port and label indicated by the fault bypass path information obtained by the query.

The backup path test control section 66 of the node N6 that has received the backup path test packet TP1 notifies the apparatus-managing section 61 about the arrival of the backup path test packet TP1. The apparatus-managing section 61 displays the success of the backup path test on, for example, an external terminal.

The network system 100 according to the fourth embodiment has substantially the same advantages as that according to the second embodiment.

In addition, the network system 100 according to the fourth embodiment can carry out a backup path test for a fault in a node or faults in a plurality of segments.

Fifth Embodiment

Next, a network system according to a fifth embodiment will be described.

For the network system according to the fifth embodiment, differences from the second to fourth embodiments described above will be mainly described, and common features will not be described here.

The fifth embodiment differs from the second to fourth embodiments in that information for determining whether or not a backup path test packet has passed through the backup path is recorded.

Figure 22:
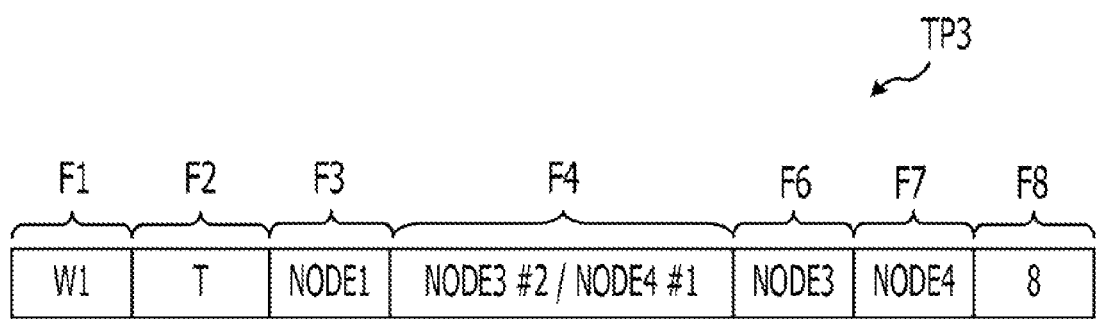
FIG. 22 is a diagram showing a format for a backup path test packet used in a fifth embodiment.

FIG. 22 is a diagram showing a format for a backup path test packet used in the fifth embodiment.

In the fifth embodiment, the backup path test control section 16 of the node N1 generates a backup path test packet TP3 having fields F6 to F8 for storing the following three types of information.

The field F6 contains information identifying a branch node (return node) from the working path to the backup path (hereinafter referred to as "branch node identification information").

The field F7 contains information identifying a merge node (return node) from the backup path to the working path (hereinafter referred to as "merge node identification information").

The field F8 contains the number of transit nodes from the start point to the end point of the path.

When the backup path test control section of each node receives the backup path test packet TP3, it stores the ID of its own node in the field F6 if it determines to forward the backup path test packet TP3 from the working path to the backup path. On the other hand, the backup path test control section of each node stores the ID of its own node in the field F7 if it determines to forward the backup path test packet TP3 from the backup path to the working path.

Upon receiving the backup path test packet TP3, the backup path test control section of each node increments the number of nodes in the field F8 of the backup path test packet TP1 by 1 and forwards it to the next node.

Next, the packet transmission process of the start node in a backup path test in the fifth embodiment will be described.

Figure 23:
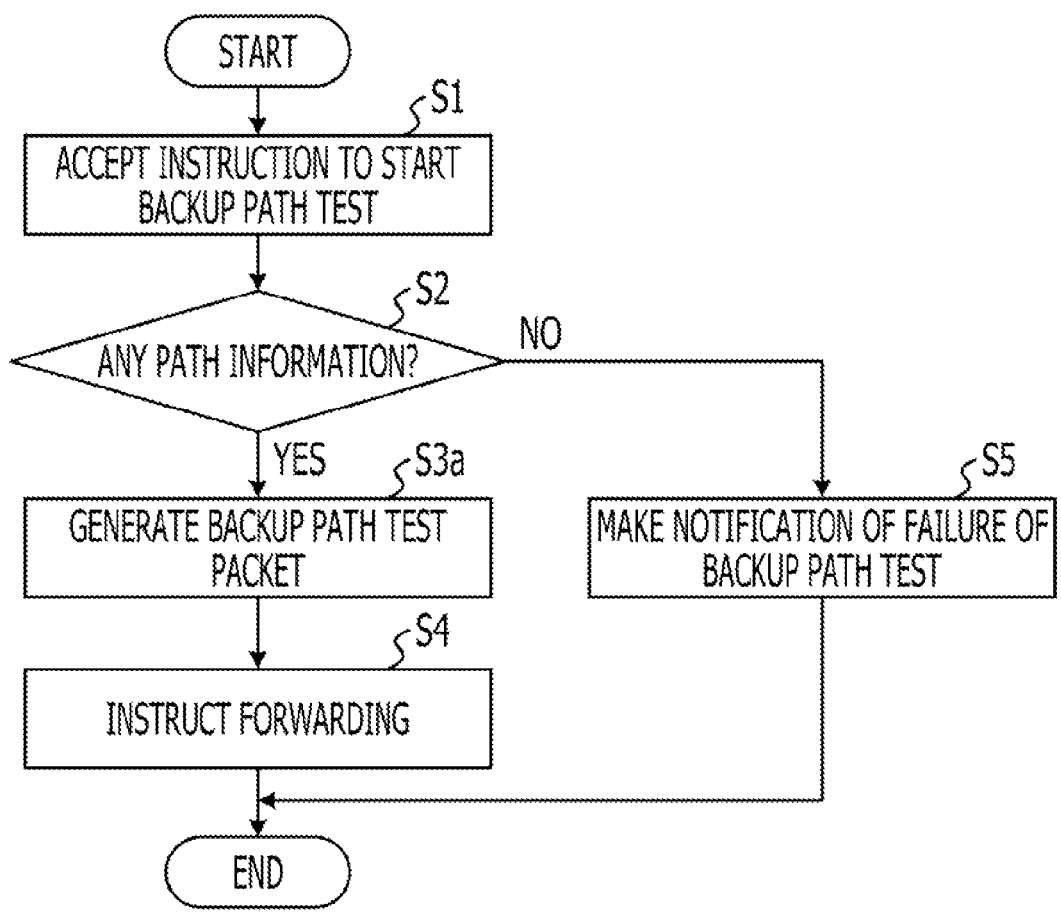
FIG. 23 is a flowchart showing the process of a backup path test control section when starting a backup path test in the fifth embodiment.

FIG. 23 is a flowchart showing the process of the backup path test control section when starting a backup path test in the fifth embodiment. This flowchart shows the process of the node that starts a backup path test.

Step S1

The backup path test control section 16 accepts an instruction to start a backup path test, with the target path and the point of fault designated by the apparatus-managing section 11. The process then goes to Step S2.

Step S2

The backup path test control section 16 searches the target path column of the label table to determine whether or not there is any path information. If there is any path information ("Yes" in Step S2), the process goes to Step S3. If there is no path information ("No" in Step S2), the process goes to Step S5.

Step S3a

The backup path test control section 16 generates a backup path test packet TP3 in which the fields F6 and F7 are empty and the field F8 is set to "0." The process then goes to Step S4.

Step S4

The backup path test control section 16 instructs the management-packet processing section 15 to forward the generated backup path test packet TP3. The backup path test control section 16 then terminates the process.

Step S5

The backup path test control section 16 notifies the apparatus-managing section 11 about the failure to start a backup path test. The backup path test control section 16 then terminates the process.

Next, the process of the nodes N2 to N8 in a backup path test in the fifth embodiment will be described. As a representative example of the nodes N2 to N8, the process of the node N2 in a backup path test will be described.

Figure 24:
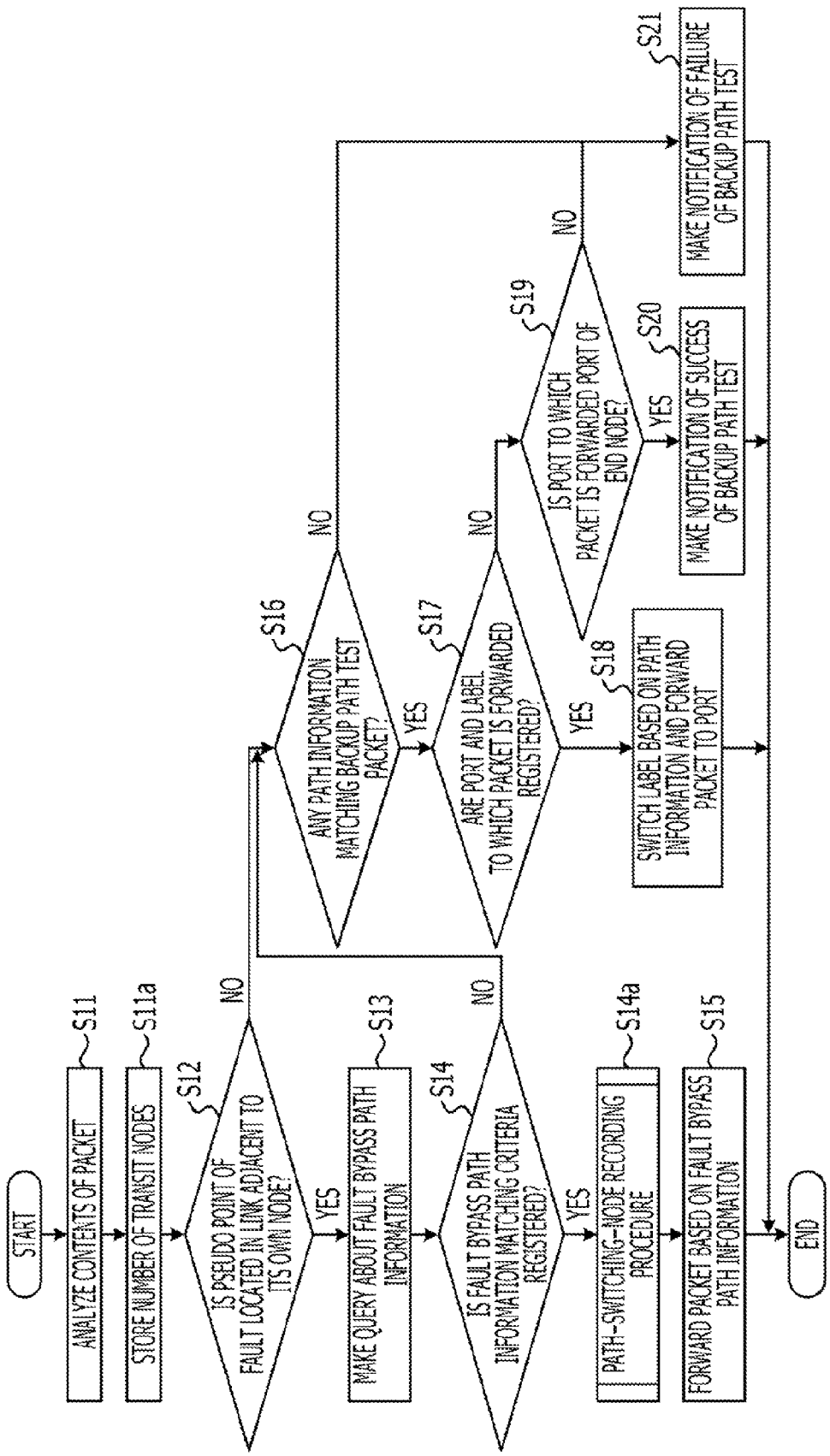
FIG. 24 is a flowchart showing the process of each node in a backup path test in the fifth embodiment.

FIG. 24 is a flowchart showing the process of each node in a backup path test in the fourth embodiment. This flowchart shows the process of the node that has received the backup path test packet TP3.

Step S11

The management-packet processing section 25 receives a backup path test packet TP3 extracted by the management-packet extracting sections 28a and analyzes the contents thereof. The process then goes to Step S11a.

Step S11a

The backup path test control section 26 executes a number-of-transit-nodes recording procedure. Specifically, the backup path test control section 16 increments the number of transit nodes stored in the field F8 of the received backup path test packet TP3 by 1. The process then goes to Step S12.

Step S12

Based on the result of the packet analysis in Step S11, the backup path test control section 26 determines whether or not the pseudo point of fault is located in a link adjacent to its own node. If the backup path test control section 26 determines that the pseudo point of fault is located in a link adjacent to its own node ("Yes" in Step S12), the process goes to Step S13. If the backup path test control section 26 determines that the pseudo point of fault is not located in a link adjacent to its own node ("No" in Step S12), the process goes to Step S16.

Step S13

The backup path test control section 26 queries the fault bypass control section 24 for fault bypass path information by notifying it about the faulty port, the receiving port, and the received label. The process then goes to Step S14.

Step S14

The fault bypass control section 24 refers to the fault bypass path management table 24a to determine whether or not fault bypass path information matching the criteria is registered in the fault bypass path management table 24a. If fault bypass path information matching the criteria is registered in the fault bypass path management table 24a ("Yes" in Step S14), the process goes to Step S14a. If no fault bypass path information matching the criteria is registered in the fault bypass path management table 24a ("No" in Step S14), the process goes to Step S16.

Step S14a

The backup path test control section 26 executes a path-switching-node recording procedure. The process then goes to Step S15.

Step S15

Based on the settings of the path information, the backup path test control section 26 switches the path from the working path to the backup path or from the backup path to the working path and instructs the management-packet processing section 25 to forward the backup path test packet TP3. This node then terminates the process.

Step S16

The fault bypass control section 24 searches the label table 22a to determine whether or not there is any path information matching the port and label from which the backup path test packet TP3 has been received. If there is matching path information ("Yes" in Step S16), the process goes to Step S17. If there is no matching path information ("No" in Step S16), the process goes to Step S21.

Step S17

The fault bypass control section 24 determines whether or not the port and label to which the backup path test packet TP3 is forwarded are registered in the matching path information in Step S16. If the port and label to which the backup path test packet TP3 is forwarded are registered ("Yes" in Step S17), the process goes to Step S18. If the port and label to which the backup path test packet TP3 is forwarded are registered ("No" in Step S17), the process goes to Step S19.

Step S18

The fault bypass control section 24 rewrites the label of the backup path test packet TP3 to the label registered in the matching path information in Step S16 and forwards the backup path test packet TP3 to the port registered in the matching path information in Step S16. This node then terminates the process.

Step S19

The backup path test control section 26 determines whether or not the port to which the backup path test packet TP3 is forwarded is a port of the end node of the network system 100. If the port to which the backup path test packet TP3 is forwarded is a port of the end node of the network system 100 ("Yes" in Step S19), the process goes to Step S20. If the port to which the backup path test packet TP3 is forwarded is not a port of the end node of the network system 100 ("No" in Step S19), the process goes to Step S21.

Step S20

The backup path test control section 26 notifies the apparatus-managing section 21 about the success of the backup path test. This node then terminates the process.

Step S21

The backup path test control section 26 notifies the apparatus-managing section 21 about the failure of the backup path test. This node then terminates the process.

This is the end of the description of the process in FIG. 24.

Next, the path-switching-node recording procedure in Step S14a will be described in detail.

Figure 25:
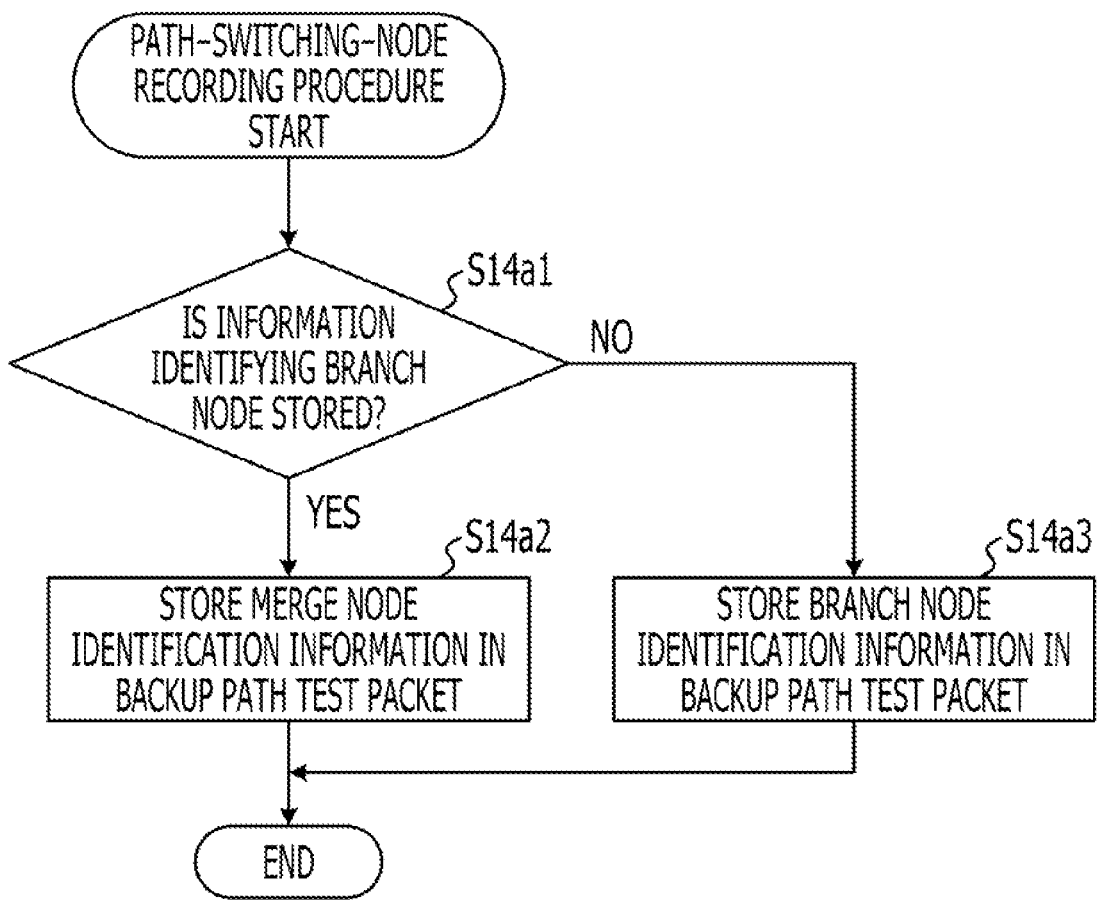
FIG. 25 is a flowchart showing a path-switching-node recording procedure.

FIG. 25 is a flowchart showing the path-switching-node recording procedure.

Step S14a1

The backup path test control section 16 determines whether or not the field F6 contains branch node identification information. If the field F6 contains branch node identification information ("Yes" in Step S14a1), the procedure goes to Step S14a2. If the field F6 contains no branch node identification information ("No" in Step S14a1), the procedure goes to Step S14a3.

Step S14a2

The backup path test control section 16 stores the ID of its own node in the field F7 of the received backup path test packet TP3 as merge node identification information. The backup path test control section 16 then terminates the path-switching-node recording procedure.

Step S14a3

The backup path test control section 16 stores the ID of its own node in the field F6 of the received backup path test packet TP3 as branch node identification information. The backup path test control section 16 then terminates the path-switching-node recording procedure.

This is the end of the description of the path-switching-node recording procedure.

Next, the operation of the network system 100 in a backup path test in the fifth embodiment will be described using an example.

In this example, assuming that a fault has occurred in the link between the nodes N3 and N4, as in the second embodiment, a pseudo point of fault is set between the nodes N3 and N4.

FIG. 26 is a table illustrating transition of data stored in a backup path test packet TP3 that passes only through the working path in the example of the fifth embodiment.

A table T1 shown in FIG. 26 shows transition of information stored in the fields of a backup path test packet TP3 that passes only through the working path in a backup path test.

In the Table T1, the transit node column shows information identifying the node through which the backup path test packet TP3 passes. The branch node column shows branch node identification information stored in the field F6 of the backup path test packet TP3. The merge node column shows merge node identification information stored in the field F7 of the backup path test packet TP3. The number-of-transit-nodes column shows the number of transit nodes stored in the field F8 of the backup path test packet TP3.

If the backup path test packet TP3 passes only through the working path, it reaches the end node N6 without any information stored in the field F6 or F7 because the path is not switched between the working and backup paths. In addition, the number of nodes in the field F8 is incremented each time the backup path test packet TP3 passes through a node. This case is shown in FIG. 26.

FIG. 27 is a table illustrating transition of data stored in a backup path test packet TP3 that passes through both the working path and the backup path in the example of the fifth embodiment. FIG. 27 shows, as an example, the case where a fault is set between the nodes N3 and N4, as in FIG. 10.

A table T2 shows transition of information stored in the fields F6, F7, and F8 of a backup path test packet TP3 that passes through the backup path in a backup path test in the example of the fifth embodiment.

The node N3 forwards the backup path test packet TP3 from the working path to the backup path. Accordingly, when the backup path test packet TP3 passes through the node N3, the backup path test control section 36 of the node N3 stores "Node N3" in the field F6 of the backup path test packet TP3. The node N4, on the other hand, forwards the backup path test packet TP3 from the backup path to the working path. Accordingly, when the backup path test packet TP3 passes through the node N4, the backup path test control section 46 of the node N4 stores "Node N4" in the field F7 of the backup path test packet TP3. Thus, when the backup path test packet TP3 reaches the end node N6, it can determine that the backup path test packet TP3 has passed the backup path between the branch node and the merge node.

In addition, when each node forwards the backup path test packet TP3, it increments the number of nodes in the field F8. This allows the end node N6 to determine the difference in path length (number of transit nodes) between the case where the backup path test packet TP3 has passed through the backup path and the case where it has not passed through the backup path.

The network system 100 according to the fifth embodiment has substantially the same advantages as that according to the second embodiment.

In the network system 100 according to the fifth embodiment, additionally, the node that has transmitted the backup path test packet TP3 can identify the node that has rerouted the backup path test packet TP3 from the working path to the backup path and the node that has rerouted the backup path test packet TP3 from the backup path to the working path. In addition, the node that has transmitted the backup path test packet TP3 can detect the number of nodes through which the backup path test packet TP3 has passed.

Sixth Embodiment

Next, a network system according to a sixth embodiment will be described.

For the network system according to the sixth embodiment, differences from the fifth embodiment described above will be mainly described, and common features will not be described here.

Figure 28:
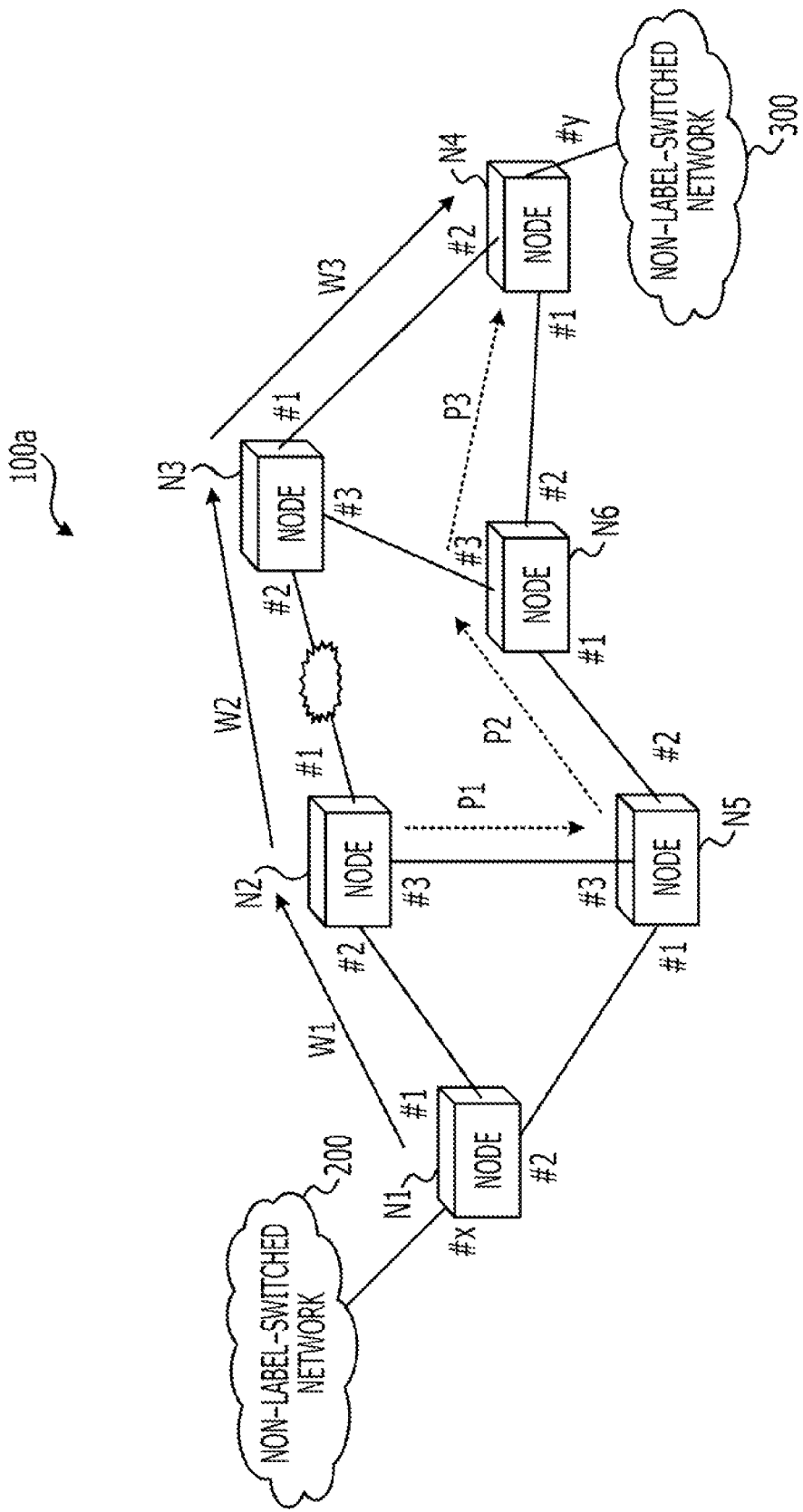
FIG. 28 is a diagram showing a network system according to a sixth embodiment.

FIG. 28 is a diagram showing a network system according to a sixth embodiment.

In the fifth embodiment, a backup path test on a network including a ring network has been described; a network system 100a according to the sixth embodiment differs in that the nodes N1 to N6 form a mesh network.

A mesh network has more links between the nodes and more paths between the nodes from and to which packets are forwarded. In MPLS-TP, however, a backup path serving as a bypass path when a fault occurs at a certain point in a working path is basically defined in advance, as in the case of a ring network. Accordingly, a backup path test packet can be used to check the backup path set to each node or set for switching in advance.

A mesh network, however, differs from a ring network in the following point: in a mesh network, packets are not necessarily rerouted from the working path to the backup path at a node before a point of fault and rerouted from the backup path to the working path at another node.

The backup path shown in FIG. 28 is configured such that if a fault occurs in the link between the nodes N2 and N3, packets pass through the nodes N5 and N6 on the backup path in that order to flow directly toward the end node, namely, the node N4, rather than toward the node N3.

This is because the shortest path (or lowest-cost path) is set up using the topology of a mesh network. Thus, the shortest path is typically set up as the backup path.

FIG. 29 is a diagram showing label tables and fault bypass path management tables used in the sixth embodiment.

FIG. 29 shows all label tables and fault bypass path management tables possessed by the nodes.

As shown in the working path and backup path columns of the label table 42b of the node N4, packets received from both the path indicated by the path information "port #2, label W3" and the path indicated by the path information "port #1, label P3" flow to the end port #y.

Thus, the node N4 can receive packets without switching the path, that is, without rewriting the label table 42b, and no fault bypass path information is registered in the fault bypass path management table 44b. This is based on the assumption that no packet flows through the backup path in a normal (non-faulty) condition after the node N2, serving as the starting point of the backup path, switches the transmission direction.

Figure 30:
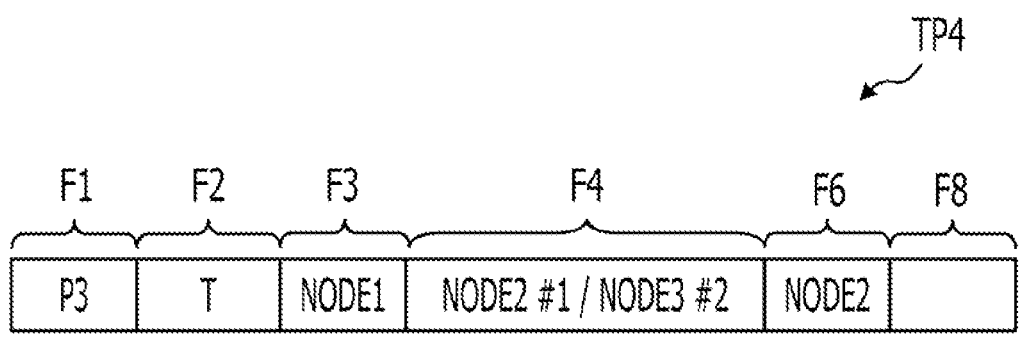
FIG. 30 is a diagram showing a format for a backup path test packet used in the sixth embodiment.

FIG. 30 is a diagram showing a format for a backup path test packet used in the sixth embodiment.

As described above, a mesh network does not necessarily need path switching at the node where the working and backup paths merge. Unlike the backup path test packet TP3, a backup path test packet TP4 used in the sixth embodiment does not have the field F7 for storing the merge node from the backup path to the working path. In the result determination of the end node, the lack of information about the merge node is not regarded as the failure of the backup path test.

Figure 31:
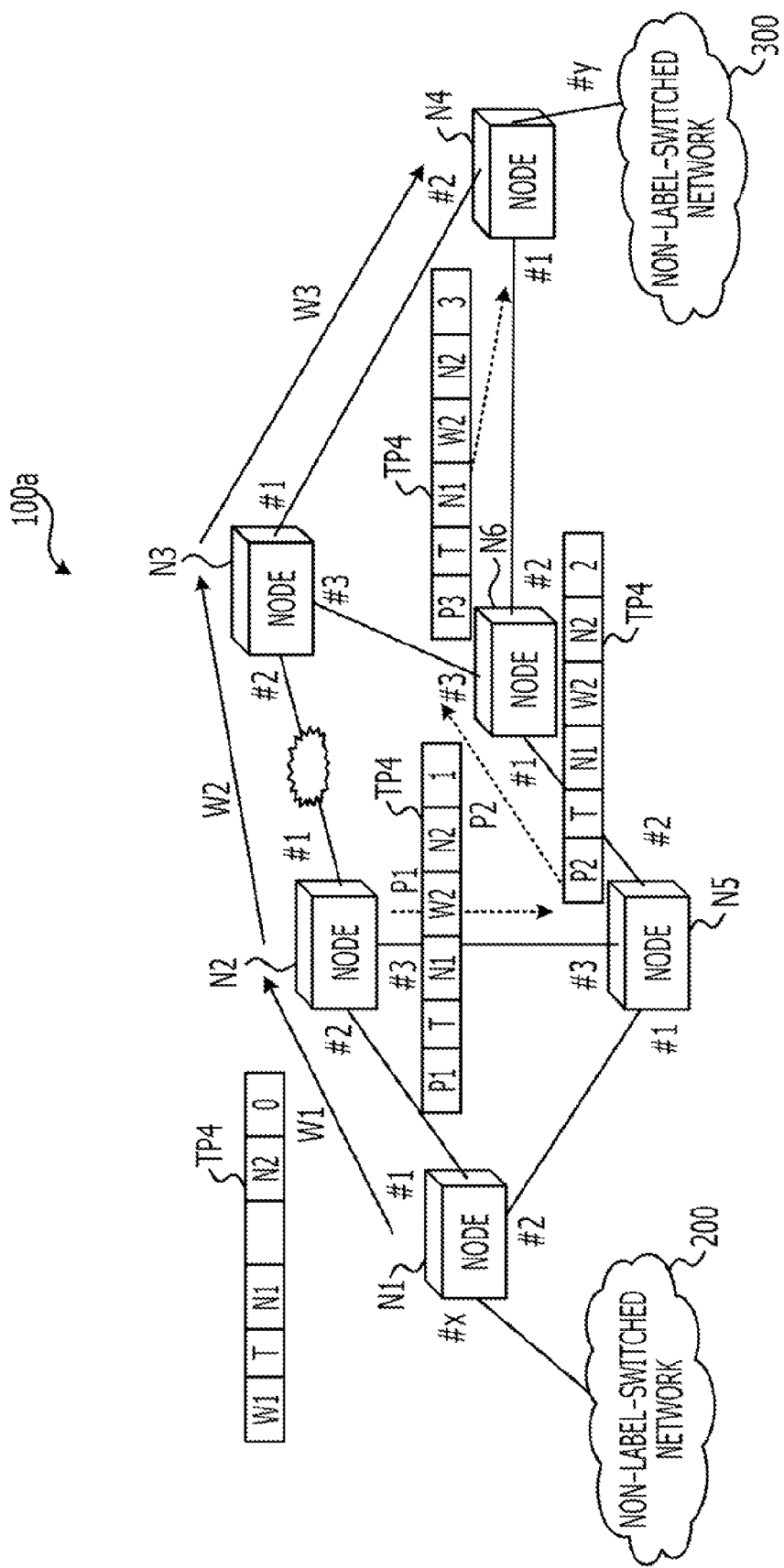
FIG. 31 is a diagram illustrating the operation of the network system according to the sixth embodiment in a backup path test.

FIG. 31 is a diagram illustrating the operation of the network system according to the sixth embodiment in a backup path test.

The node N1, which is the start node of the backup path test, the node N2, which is a node adjacent to the point of fault, and the nodes N5 and N6, which are transit nodes on the backup path, execute substantially the same processing as in a ring network.

The management-packet extracting section 48a of the node N4, which is the end node of the backup path test, receives a backup path test packet TP4 having the label "P3" at the port #1. The backup path test control section 46 of the node N4 notified about the receipt of the backup path test packet TP4 searches the label table 42b. The backup path test control section 46 recognizes that its own node N4 is the end node of the backup path test because the port and the label stored in the backup path test packet TP4 match the path information stored in the node N4, namely, "(#1-P3)→(#y)." The backup path test control section 46 of the node N4 then notifies the apparatus-managing section 41 about the result of the backup path test.

The network system 100a according to the sixth embodiment has substantially the same advantages as that according to the fifth embodiment.

In addition, the network system 100a according to the sixth embodiment can be applied to a mesh network.

Whereas apparatuses and methods for packet forwarding according to embodiments have been described, they should be not construed as limiting. For example, each element can be replaced with any other element having a similar function. In addition, any other element or step can be added.

In addition, any two or more elements (features) of the embodiments described above can be combined.

The above processing functions can be implemented by a computer (processor). In this case, provided is a program specifying the processes of the functions possessed by the packet-forwarding apparatus 1 or the nodes N1 to N8. The program is executed by a computer to implement the above processing functions on the computer. The program specifying the processes can be recorded on a computer-readable recording medium. Examples of computer-readable recording media include magnetic storage devices, optical discs, magneto-optical recording media, and semiconductor memories. Examples of magnetic storage devices include hard disk drives, flexible disks (FD), and magnetic tapes. Examples of optical discs include DVDs (digital versatile disc), DVD-RAMs, CD-ROMs (compact disc read-only memory), and CD/RWs (compact disc rewritable). Examples of magneto-optical recording media include magneto-optical (MO) disks.

To distribute the program, for example, portable recording media, such as DVDs or CD-ROMs, on which that program is recorded are marketed. Alternatively, the program can be stored in a storage of a server computer and downloaded from the server computer to another computer via a network.

A computer that executes the program stores, for example, a program recorded on a portable recording medium or a program downloaded from a server computer in its own storage (memory). The computer then loads the program from its own storage to execute processing according to the program. The computer can also load the program directly from a portable recording medium to execute processing according to the program. Alternatively, the computer can execute processing according to the program sequentially as it downloads the program from a server computer connected to the computer via a network.

In addition, at least some of the above processing functions can be implemented by an electronic circuit such as a digital signal processor (DSP), an application-specific integrated circuit (ASIC), or a programmable logic device (PLD).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for packet forwarding comprising:
   receiving packets;
   extracting a test packet containing information indicating a path to be verified from the received packets and pseudo information indicating the path as being unavailable; and
   forwarding the test packet to the path to be verified, rather than to a first path to which the received packets are forwarded, based on the information indicating the path to be verified contained in the test packet.

2. A packet-forwarding apparatus comprising:
   a packet-receiving circuit configured to receive packets;
   a memory storing first path information indicating a first path to which the received packets are forwarded and a second path to which the received packets are forwarded;
   a plurality of packet-transmitting circuits configured to transmit packets; and
   a processor configured to extract a test packet containing information indicating a path to be verified from the received packets and pseudo information indicating the path as being unavailable, and to forward the test packet from the packet-transmitting circuit corresponding to the second path information, rather than from the packet-transmitting circuit corresponding to the first path information, based on the information indicating the path to be verified contained in the test packet.

3. The packet-forwarding apparatus according to claim 2, wherein
   the information, contained in the test packet, including information about a pseudo unavailable point set in the path to be verified in a network; and
   the processor determines the path to which the test packet is to be forwarded based on the information about the pseudo unavailable point and the second path information stored in the storage.

4. The packet-forwarding apparatus according to claim 3, wherein
   the information about the pseudo unavailable point contained in the test packet contains an apparatus identifier;
   when the packet-forwarding apparatus has an apparatus identifier identical to the apparatus identifier contained in the test packet, the processor instructs one of the packet-transmitting circuits to forward the test packet to a packet-forwarding apparatus that has already forwarded the test packet; and
   the packet-transmitting circuit that has received the instruction transmits the test packet based on the instruction.

5. The packet-forwarding apparatus according to claim 2, wherein the processor generates the test packet.

6. The packet-forwarding apparatus according to claim 5, wherein
   the test packet includes a source information storage field for storing information identifying a packet-forwarding apparatus that has already started transmission of the test packet; and
   the processor does not transmit the test packet when the processor identifies the packet-forwarding apparatus as the packet-forwarding apparatus that has already started transmission of the test packet, based on the information stored in the source information storage field.

7. The packet-forwarding apparatus according to claim 2, wherein
   the test packet includes a counter field for storing the number of apparatuses through which the test packet has passed during packet forwarding; and
   the processor increments the counter field of the test packet to be forwarded.

8. The packet-forwarding apparatus according to claim 2, wherein the first path information and the second path information each include a correspondence between a label contained in the received packets and a label contained in the packets to be transmitted.

* * * * *